United States Patent
Elizarrarás Maya et al.

(10) Patent No.: US 10,899,864 B2
(45) Date of Patent: Jan. 26, 2021

(54) POLAR MODIFIER SYSTEMS FOR HIGH VINYL BLOCK COPOLYMERIZATION

(71) Applicant: Dynasol Elastómeros, S.A. de C.V., Altamira (MX)

(72) Inventors: Daniel Abraham Elizarrarás Maya, Tampico (MX); Christopher J. Hardiman, Farmington, CT (US); Sergio Corona Galván, Las Rozas (ES); Sergio Alberto Moctezuma Espiricueto, Altamira (MX); Luis Antonio Rodríguez Guadarrama, Madrid (ES)

(73) Assignee: Dynasol Elastómeros, S.A. de C.V., Altamira (MX)

( * ) Notice: Subject to any disclaimer, the term of this patent is extended or adjusted under 35 U.S.C. 154(b) by 0 days.

(21) Appl. No.: 16/094,752

(22) PCT Filed: Sep. 8, 2017

(86) PCT No.: PCT/IB2017/001270
§ 371 (c)(1),
(2) Date: Oct. 18, 2018

(87) PCT Pub. No.: WO2018/047008
PCT Pub. Date: Mar. 15, 2018

(65) Prior Publication Data
US 2020/0048393 A1 Feb. 13, 2020

(51) Int. Cl.
*C08F 297/04* (2006.01)

(52) U.S. Cl.
CPC ...... *C08F 297/042* (2013.01); *C08F 297/044* (2013.01); *C08F 2810/00* (2013.01)

(58) Field of Classification Search
CPC .......... C08F 297/042; C08F 297/044
See application file for complete search history.

(56) References Cited

U.S. PATENT DOCUMENTS

| | | |
|---|---|---|
| 3,787,377 A | 1/1974 | Halasa et al. |
| 4,104,465 A | 8/1978 | Halasa |
| 5,336,739 A | 8/1994 | Hsu et al. |
| 5,798,419 A | 8/1998 | Ruiz Santa Quiteria et al. |
| 5,906,956 A | 5/1999 | Halasa et al. |
| 6,140,434 A | 10/2000 | Halasa et al. |
| 6,372,863 B1 | 4/2002 | Kerns et al. |
| 6,566,478 B1 | 5/2003 | Henning et al. |
| 6,583,246 B2 | 6/2003 | Grun et al. |
| 7,153,920 B2 | 12/2006 | Kerns et al. |
| 7,470,760 B2 | 12/2008 | Cabioch et al. |
| 7,851,558 B2 | 12/2010 | King et al. |
| 8,138,270 B2 | 3/2012 | Sasagawa et al. |
| 2010/0016508 A1 | 1/2010 | Sasagawa et al. |
| 2011/0092650 A1 | 4/2011 | Cao et al. |
| 2012/0004379 A1 | 1/2012 | Steinhauser |

OTHER PUBLICATIONS

Kozak, et al., Influence of Polar Modifiers on Microstructure of Polybutadiene Obtained by Anioic Polymerization. Part 3: Lewis acid alkoxide and Lewis base amine, amine-ether, and ether mixed-type polar modifiers, International Journal of Polymer Analysis and Characterization, 2016, 21:1, 44-58.

*Primary Examiner* — Mark S Kaucher
(74) *Attorney, Agent, or Firm* — Stephen S. Hodgson

(57) ABSTRACT

Polar modifier systems based on a blend of DTHFP, ETE, TMEDA, DMTHFMA and/or functionally similar compounds with BDMAEE and SMT are used to make block copolymers having high levels of pendant vinyl double bond repeat units, which is through highly selective 1,2-bond butadiene addition, low vinylcyclopentane formation, unimodal narrow molecular weight distribution, and a low level of randomized co-monomer repeat units. The block copolymers have very high levels of 1,2-vinyl content and high 3,4-vinyl bond addition of the conjugated diene monomer and low vinylcyclopentane content. The polar modifier systems provide a fast polymerization rate, with a unimodal narrow molecular weight distribution. The polar modifier systems allow operation at a higher temperature than in prior art systems, which reduces cooling requirements.

33 Claims, 3 Drawing Sheets

Figure 1. Polydiene microstructures
(when R=H, 1,2- enchainment is equivalent to 3,4-, for example with butadiene
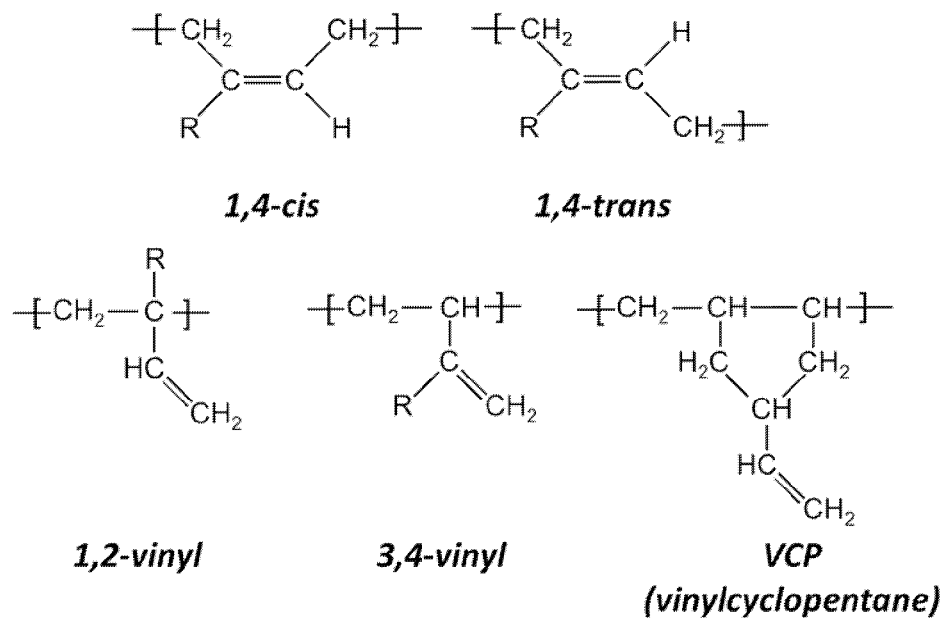
Figure 2. Molecular weight distribution of high vinyl linear SBS invention vs. prior art
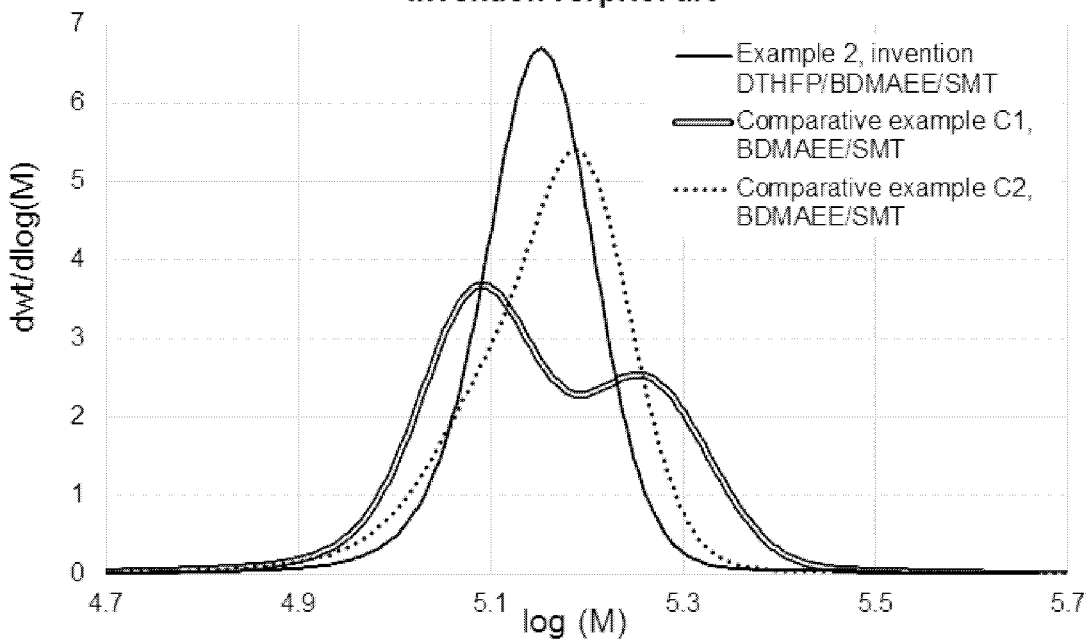

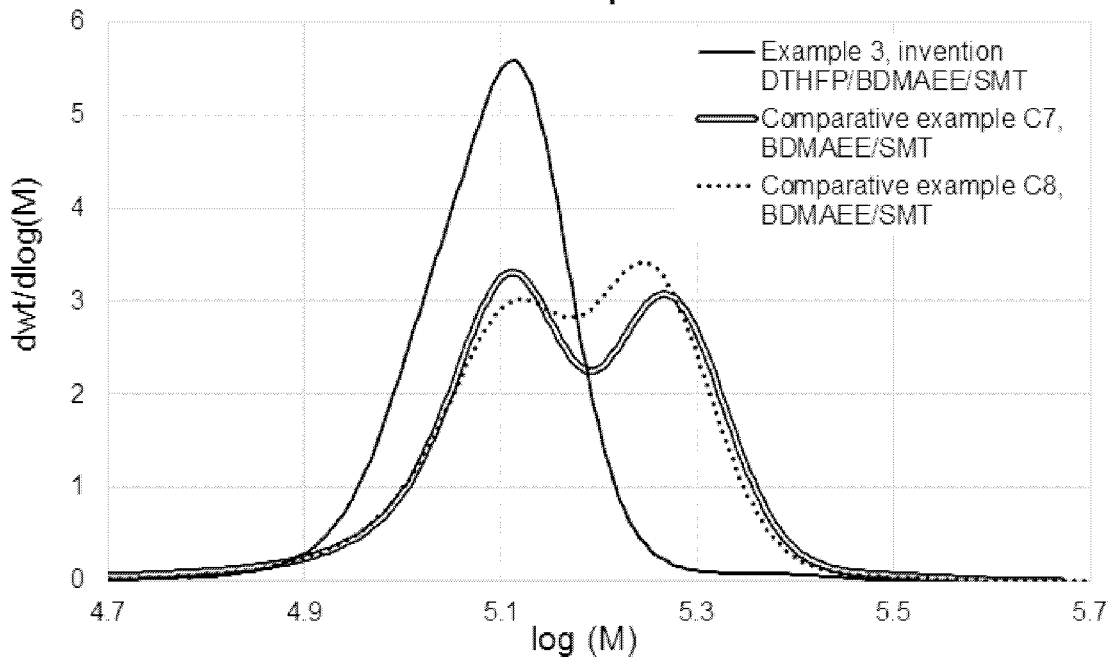
Figure 3. Molecular weight distribution of high vinyl linear SBS invention vs. prior art
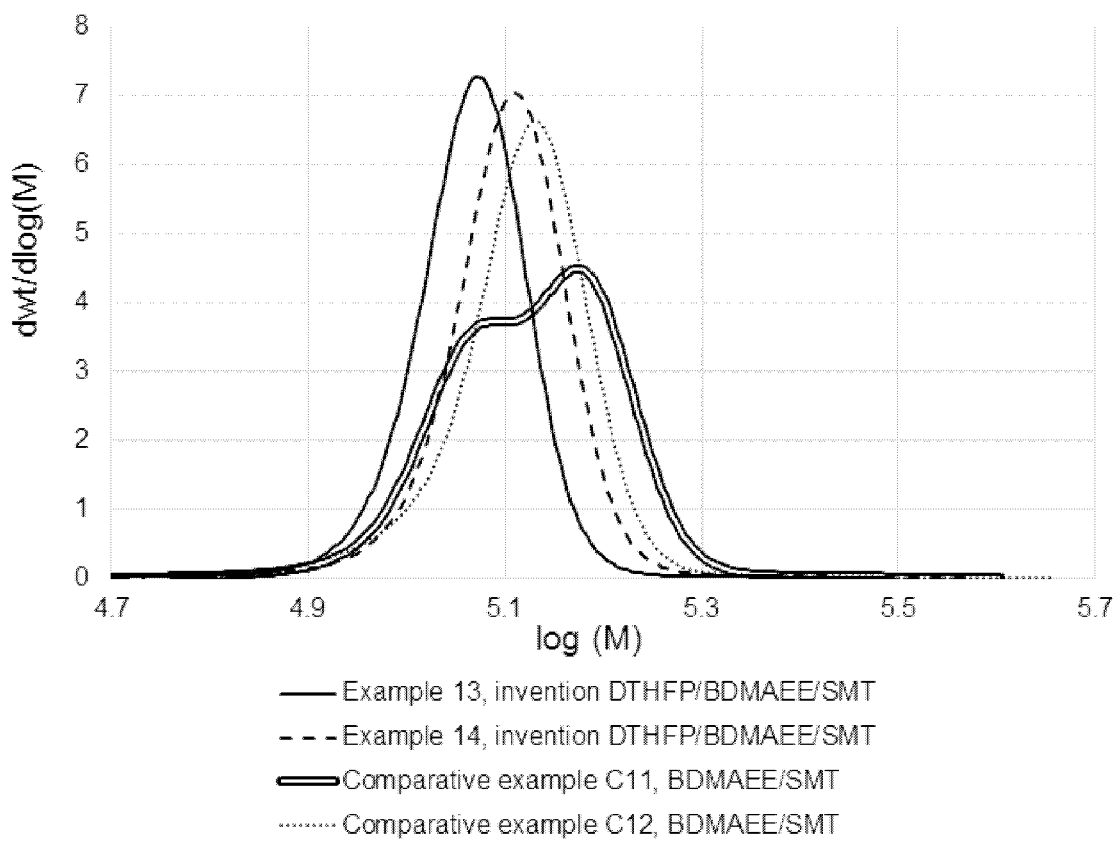
Figure 4. Molecular weight distribution of high vinyl linear SBS invention vs. prior art

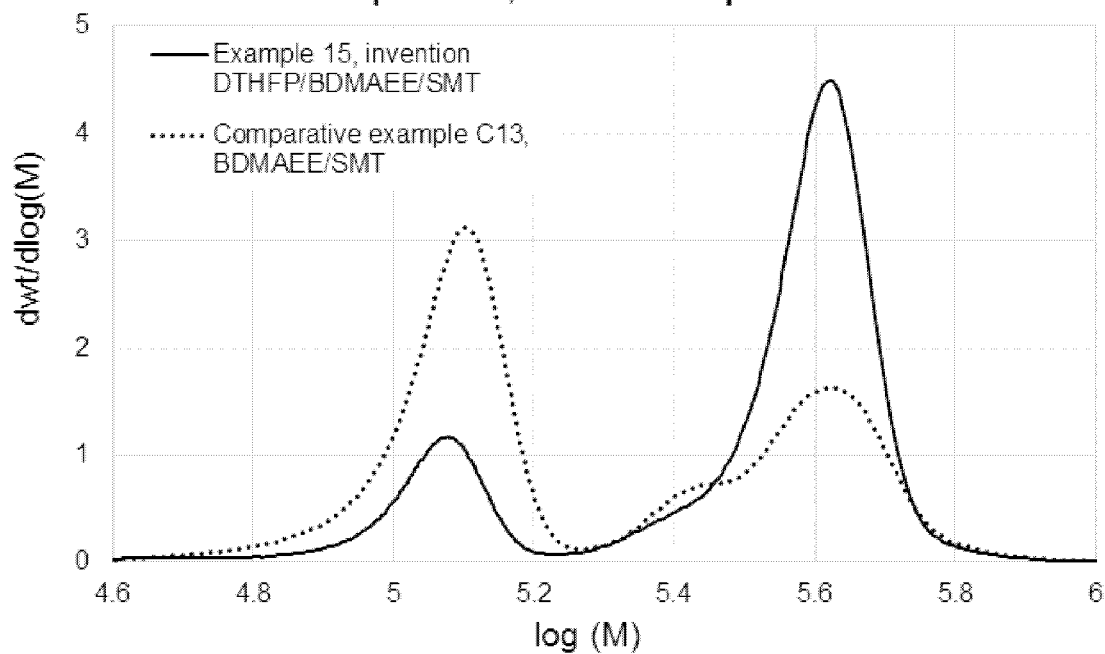

POLAR MODIFIER SYSTEMS FOR HIGH VINYL BLOCK COPOLYMERIZATION

CROSS REFERENCE TO RELATED APPLICATIONS

This is a national stage application filed under 35 U.S.C. 371 for International Application No. PCT/IB2017/001270, which was published as Publication No. WO 2018/047008 A2. This application claims priority to U.S. Provisional Patent Application Ser. Nos. 62/385,776 filed Sep. 9, 2016, and 62/452,406 filed Jan. 31, 2017, each of which is incorporated by reference.

BACKGROUND OF THE INVENTION

1. Field of the Invention

This present invention pertains to polar modifiers and processes for the synthesis of block copolymers of conjugated diene monomers and vinyl aromatic monomers by organolithium initiated anionic polymerization in aliphatic hydrocarbon solution. More particularly, the block copolymers produced with the polar modifier systems and processes of the invention advantageously incorporate very high levels of repeat units with pendant vinyl double bonds with low levels of vinylcyclopentane repeat units. Furthermore, invention enables the production of this kind of block copolymers at a fast polymerization rates, with narrow molecular weight distribution, having low content of randomized co-monomer repeat unit transitions among co-monomer blocks and employing less demanding cooling requirements to carry out polymerization than prior art.

2. Description of the Related Art

Batch and semi-batch processes of alkyllithium initiated anionic polymerization in aliphatic hydrocarbon solution are versatile technologies to produce block copolymers of conjugated diene monomers, such as butadiene and isoprene, and vinyl aromatic monomers, such as styrene. This is because anionic polymerization and copolymerization of these types of monomers in aliphatic hydrocarbons occurs by a chain reaction mechanism that lacks termination, nor chain transfer reactions; polymerization mechanisms such as this are so called living polymerizations. Livingness of polymerization allows for multiple block sequence configurations, coupling schemes, end group functionalization chemistries and precise control of composition, molecular weight and molecular weight distribution. It is the objective of the present invention to provide new polar modifier systems specifically oriented to produce a distinctive kind of block copolymers that incorporate very high levels of pendant vinyl bonds, either by 1,2 or 3,4-addition of conjugated dienes. Many polar modifiers have been disclosed that can influence conjugated diene mode of addition towards this kind of microstructure, nevertheless, a very common drawback is that their capability to promote 1,2 or 3,4-addition drops significantly when polymerization temperature rises (Hsie, H. L.; Quirk, R. P., Anionic Polymerization: principles and practical applications, Marcel Dekker, 1996, page 217). Typical operating temperatures and limited heat removal capacity of industrial processes rule out most options of polar modifiers to get 1,2-vinyl contents higher than 80 wt % on a conjugated diene basis. Furthermore, various polar modifiers are prone to widen molecular weight distribution, due to chain transfer reactions (Hsie, H. L.; Quirk, R. P., Anionic Polymerization: principles and practical applications, Marcel Dekker, 1996, pages 188-189 and 217).

When polymerizing butadiene in the presence polar modifiers in amounts prone to get high vinyl contents (>70%) a fraction of the butadiene gets incorporated as repeats units of vinyl cyclopentane (VCP). It takes two butadiene molecules to get a single VCP repeat unit, and a single pendant double bond gets generated (see FIG. 1).

Luxton et al. (Polymer, Vol. 22, Issue 3, 1981, pages 382-386), explain that contributing factors to increase VCP content are: low butadiene concentrations during polymerization, use of high loadings of TMEDA and/or sodium counterion, as well as high polymerization temperature.

VCP content increases the glass transition temperature (Tg) of the polybutadiene segment, reducing the backbone flexibility and the low temperature properties, which affects the thermal and dynamic properties of the elastomer thermoplastic compositions of the block copolymers.

Present invention overcomes these obstacles enhancing productivity and control over block copolymer molecular attributes.

U.S. Pat. No. 7,851,558 provides examples of alkyllithium initiated anionic polymerization of high vinyl styrene-butadiene di-block and styrene-butadiene-styrene tri-block copolymers employing polar modifiers N,N,N',N'-tetramethylethylendiamine (TMEDA), ditetrahydrofurfurylpropane (DTHFP), dipiperidinoethane (DIPIP) and tetrahydrofuran (THF). 1,2-vinyl isomer contents reported were up to 78% for TMEDA, 84% for DTHFP, 96% for DIPIP and 54% for THF. Nevertheless, polymerization temperature was kept very low (25° C.), solvent to monomer mass ratio was rather high (about 12), and butadiene block polymerized in a time span of two hours.

U.S. Pat. No. 5,906,956 shows synergistic effect of low molecular weight alkoxides as sodium t-amylate (STA) and TMEDA that made possible homopolymerizing butadiene at 75° C., getting full conversion in 10 minutes and 83% vinyl incorporation. STA molar ratio to lithium was at least 0.5, and TMEDA ratio to lithium of at least 2. No experimental data is shown for synthesis of block copolymers of conjugated dienes and vinyl aromatic monomers, neither for VCP content of the polybutadiene synthesized.

U.S. Pat. No. 6,140,434 improved the feasibility of industrial operation of TMEDA/alkoxide recipe by using sodium mentholate (SMT). Main advantage of SMT over STA was from an industrial operative stand point. STA generates a volatile alcohol on contact with water on stripping stage, which is difficult to remove from solvent recycle and poisons anionic polymerization, whereas SMT does not affect purity of solvent recycle because of high boiling point of it, and of its menthol by-product. It is shown an example were a polybutadiene was prepared with 85% vinyl incorporation, using a solvent to monomer ratio about 8.09, TMEDA/SMT/Li molar ratio of 8/0.25/1, reaction temperature of 65° C., and reaction time of 10 minutes. No experimental data is shown for synthesis of block copolymers of conjugated dienes and vinyl aromatic monomers. No experimental data is shown for synthesis of block copolymers of conjugated dienes and vinyl aromatic monomers, neither for VCP content of the polybutadiene synthesized.

U.S. Pat. No. 8,138,270 shows TMEDA/sodium alkoxide/n-butyllithium polar modifier/initiator system is preparing high vinyl SBS type triblock copolymer. SBS copolymer with narrow weight distribution, with polydispersity index Mw/Mn of 1.06, was obtained with overall vinyl levels reported at 76.8% on a butadiene weight basis, with TMEDA/sodium t-pentoxide/n-butyllithium ratio of 1.8/0.055/1. Polymerization was performed in a semi-batch mode temperature, feeding butadiene to the reactor along a period of 100 minutes, while controlling reaction temperature at 70° C. Very similar result was obtained when replacing sodium t-pentoxide for sodium t-butoxide. It was shown that molecular weight distribution widening occurred to polydispersity index of 1.23 if sodium t-pentoxide/Li molar ratio was increased to 0.12. VCP content was not reported.

U.S. Pat. No. 7,740,760 takes advantage of TMEDA/SMT system to increase Tg of polybutadienes and random styrene-butadiene copolymers (SBR) by raising VCP content. When evaluating SBR synthesis using 4.9 moles of TMEDA per mole of active lithium in a continuous process reactor with residence time of 40 minutes and operating at 80° C., copolymer exhibited 10% VCP and 53% 1,2-vinyl levels (63 wt. % total vinyl content on a Bd basis). When adding to the recipe 0.2 equivalents of sodium t-amylate (STA) per mole of active lithium, VCP level gets to 23% while keeping 1,2 vinyl at 53% (76% total vinyl content on a Bd basis). Consequently, Tg raised from −31° C. in the low VCP containing SBR to −14° C. in the high VCP containing SBR.

Chinese patent 10845109 shows that batch polymerizing butadiene in the presence of n-butyllitium (n-BuLi) and N,N-dimethyl-tetrahydrofurfuryl amine (DMTHFMA) in cyclohexane solution, employing a DMTHFMA/n-BuLi ratio of 6/1, solvent to monomer ratio of approximately 7.7 and polymerization temperature of 60° C. gives 1,2-vinyl enrichment of 85%, but at expense of two hours of reaction time and broadening of molecular weight distribution toward polydispersity Mw/Mn index of 1.13. Attempts of coupling high vinyl polybutadienyllithium products with excess silicon tetrachloride get a maximum coupling efficiency of 66 wt. %. Amount of VCP content is not accounted in this patent. Neither is made evaluation in this patent of capability of the polar modifier system to prepare block copolymers of conjugated diene monomers and vinyl aromatic monomers.

U.S. Pat. No. 5,336,739 shows high vinyl polybutadiene and polyisoprene synthesis using ethyltetrahydrofurfuryl ether (ETE) as polar modifier, n-butyllithium initiator and hexane to monomer ratio of 4. For isoprene homopolymerization, 3,4+1,2 addition obtained was 70%, with ETE/Li molar ratio of 5 and reaction temperature controlled at 70° C. 1,2-vinyl content of polybutadiene polymerized under such conditions reached 76%; polybutadiene with 80% 1,2-vinyl enrichment was obtained when ETE/Li ratio was raised to 10, while reducing polymerization temperature to 60° C.

U.S. Patent Application 2012/0004379 A1 shows that binary polar modifier systems based on bis[2-(N,N-dimethylamino)ethyl] ether (BDMAEE) and sodium alkoxides, such as sodium 3,7-dimethyl octanolate (Na-DMO) or as sodium mentholate (SMT), are useful to get very high 1,2-vinyl contents when synthesizing polybutadiene and styrene-butadiene random copolymers (SBR) at rather high temperatures in the presence of n-butyllithium (n-BuLi). Examples are shown of polybutadiene with up to 94 wt % vinyl content when employing a BDMAEE/Na-DMO/n-BuLi molar ratio or 3/0.5/1, and of 93 wt % vinyl content when replacing Na-DMO in formulation with SMT. This polar modifier system was tested comparatively with other polar modifier systems in high vinyl polybutadiene and random styrene-butadiene copolymer, such as: BDMAEE alone, Na-DMO alone, TMEDA/Na-DMO, TMEDA/SMT, DTHFP/Na-DMO, and surpassed all of them in vinyl-enhancing capability. Nevertheless, it is also mentioned that final conversion after 60 minutes of polymerization at 80° C. is not complete; butadiene homo-polymerization with BDMAEE/Na-DMO/n-BuLi molar ratio or 3/0.5/1 reached 97% conversion, only. In addition, it is shown that Mooney viscosity rises considerably when increasing BDMAEE/n-BuLi of Na-DMO/n-BuLi ratios at fixed n-BuLi dosage. Lack of full conversion of monomer and high dependence of Mooney viscosity on polar modifier dosages are both signs of anionic active center poisoning by these polar modifiers. There is no report on this patent on VCP levels obtained, nor on the performance of polymer anions towards coupling agents or other means to prove livingness of the polymerization. There is not mention on this patent application on usefulness of this polar modifier systems for synthesis of block copolymers of conjugated diene monomers and vinyl aromatic monomers.

Kozak et al. (International Journal of Polymer Characterization, Vol. 20, 7, (2015), 602-611, and International Journal of Polymer Characterization, Vol. 21, 1, (2016), 44-58) compared performance of various polar modifier systems in a 15% butadiene solution polymerization at 70° C.: DTHFP, DTHFP/SMT, TMEDA/SMT, 2,2-bis(2,2-dimethylaminoethyl)ether (BDMAEE) and BDMAEE/SMT, among various others systems. It was found that BDMAEE/SMT was the most powerful polar modifier system in terms of 1,2-vinyl enhancement in butadiene lithium initiated polymerization, reaching about 90% vinyl content. BDMAEE alone had poor performance, reaching about 70% vinyl content but with poor conversion after 2 h of reaction. Another noteworthy finding was that combining DTHFP and SMT had a detrimental effect on vinyl content level when compared to DTHFP alone.

Halasa and Hsu, (Polymer, 43, (2002), 7111-7118), point out that any kind of alkoxide is equally effective to speed up conjugated diene reaction and to obtain high vinyl contents when combined with TMEDA. Again, in the case of butadiene it is reported vinyl levels of 82-83 while polymerizing butadiene at 75° C. in the presence of TMEDA/Li mole ratio greater or equal to 2 and alcoxide/Li ratio equal or greater than 0.5. It was reported higher Tg values, indicative of higher vinyl contents, and higher butadiene polymerization rates, when combining SMT with TMEDA than when using systems based on ethyltetrahydrofurfuryl ether/SMT (ETE, a molecule with two ether moieties). It is worthwhile noticing that vinyl contents reported throughout their studies include 2 to 6% of VCP.

The high vinyl block copolymers produced using the present invention find application in a variety of high end value fields, such as: precursors for high flow SEBS copolymers as mentioned in EP1730201 and U.S. Pat. No. 7,439,301. Such kind of SEBS are particularly useful for the manufacture of articles where it is required to avoid the usage of plasticizers and low molecular weight additives that could potentially migrate and affect use, haptics and/or health of users. Moreover, high vinyl content in SBS copolymer precursor allows the possibility to produce SEBS exhibiting high compatibility with polypropylene as mentioned in patent EP1002813, making them very useful for the manufacture of elastic films, fibers and non-wovens compounds; coupled high vinyl SBS copolymers finds use as precursor for SEBS intended for soft elastomeric films, as shown in U.S. Pat. No. 22,311,767; precursors for SEBS copolymers used in oil gel compositions for use in cable filling compounds, as shown in EP0822227; precursors for SEBS intended for sealant formulations, as shown in U.S.

Pat. No. 5,777,043; precursors of SEBS that provide high clarity and improved mechanical properties when compounded with polyolefins, as shown in US 2010/0331465 A1; for the formulation of polypropylene compositions with oxygen absorbing capability, as in US 2012/0252922 A1; for use in radiation curable hot melt adhesive compositions, as shown in U.S. Pat. No. 6,486,229; for use in hot melt pressure sensitive adhesives, as in US 2015/0191637 A1.

SUMMARY OF THE INVENTION

It has been unexpectedly found that a polar modifier system based on the ternary blends DTHFP/BDMAEE/SMT, ETE/BDMAEE/SMT, TMEDA/BDMAEE/SMT and DMTHFMA/BDMAEE/SMT are particularly advantageous to produce block copolymers of conjugated diene monomers and vinyl aromatic monomers. Very high levels of 1,2-vinyl and 3,4-vinyl bond addition of the conjugated diene monomer, low vinylcyclopentane contents, unimodal narrow molecular weight distribution, and low level of randomized repeat unit incorporation can be obtained. Furthermore, the invention enables producing this kind of copolymers at competitive production rates and with lower sensitivity of degree of 1,2-vinyl and 3,4-vinyl addition towards temperature than in previous technologies.

Even though it can be found in technical literature that BDMAEE/SMT system can be used to produce high vinyl polybutadiene at fast polymerization rates with low sensitivity of attainable vinyl content against polymerization temperature, our evaluations show that this polar modifier is not capable to produce block copolymers of vinyl aromatic monomers and conjugated diene monomers that fulfill simultaneously the requirements of unimodal narrow molecular weight distribution and low degree of randomized comonomer incorporation and competitive polymerization speed. There is a critical concentration level of this polar modifier in a formulation above which it produces problems of molecular weight widening, and even bimodal molecular weight distributed copolymers; when attempting to produce triblock SBS copolymer using BDMAEE/SMT at high loadings it is produced a blend of low molecular weight diblock copolymer with high molecular weight triblock copolymer. Below such critical loading level, BDMAEE/SMT is capable to produce block copolymers with narrow molecular weight distribution, nevertheless polymerization rate becomes rather slow; this has the concomitant disadvantage of producing block copolymers with rather high levels of randomized comonomer incorporation.

Current invention allows to produce purer SBS triblock copolymers than current Lewis base systems used to produce high-vinyl content SBS. Pure triblock SBS exhibit outstanding elastic performance compared with SBS having less purer blocks or to SBS exhibiting broader molecular weight distribution.

Current invention allows to produce SEBS having higher vinyl content than conventional methodologies. High vinyl content combined with relatively low molecular weight and mid to low styrene content allows SEBS to exhibit flow. High melt flow combined with high vinyl content allow SEBS to be more compatible with polyolefins, particularly with polypropylene, blends than are used advantageously over PVC in health-related applications. Moreover, SEBS exhibiting high melt flow could be used in many applications, either as a neat polymer or in a compound, including injection molding to produce medical devices, over molding applications for personal care, soft touch materials, and automotive parts, blown film, dipped goods, and films and fibers It was found that a polar modifier system that includes ditetrahydrofurfurylpropane (DTHFP) with BDMAEE and SMT exhibits a number of improvements compared to prior art systems. DTHFP is one of many compounds represented by formula (I) below. Although the experimental work has not yet been completed, it is reasonable to believe that many other compounds represented by formula (I), if not all of the compounds, can be substituted for DTHFP with similar results expected.

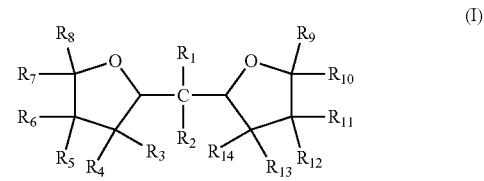

(I)

wherein $R_1$ thru $R_{10}$ independently are —H or —$C_nH_{2n+1}$ groups, wherein n=1 to 6.

It was found that a polar modifier system that includes ethyltetrahydrofurfuryl ether (ETE) with BDMAEE and SMT exhibits a number of improvements compared to prior art systems. ETE is one of many compounds represented by formula (II) below. Although the experimental work has not yet been completed, it is reasonable to believe that many other compounds represented by formula (II), if not all of the compounds, can be substituted for ETE with similar results expected.

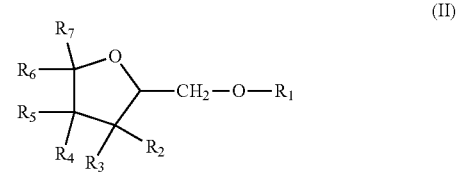

(II)

wherein R1 is a —$C_nH_{2n+1}$ group, wherein n=1 to 6; and wherein R2 thru R7 independently are —H or —$C_nH_{2n+1}$ groups, wherein n=1 to 6.

1. It was found that a polar modifier system that includes N,N,N',N'-tetramethyl ethylenediamine (TMEDA) with BDMAEE and SMT exhibits a number of improvements compared to prior art systems. TMEDA is one of many compounds represented by formula (III) below. Although the experimental work has not yet been completed, it is reasonable to believe that many other compounds represented by formula (III), if not all of the compounds, can be substituted for TMEDA with similar results expected.

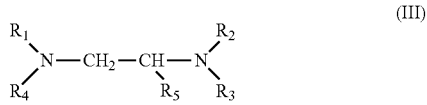

(III)

wherein R1 to R4 independently are —$CH_3$ or —$CH_2CH_3$ groups; and
wherein R5 is a —H or a —$C_nH_{2n+1}$ group, wherein n=1 to 2.

2. It was found that a polar modifier system that includes tetrahydrofurfuryl-N,N-dimethylamine with BDMAEE and SMT exhibits a number of improvements compared to prior art systems. Tetrahydrofurfuryl-N,N-dimethylamine is one of many compounds represented by formula (IV) below. Although the experimental work has not yet been completed, it is reasonable to believe that many other compounds represented by formula (IV), if not all of the compounds, can be substituted for tetrahydrofurfuryl-N,N-dimethylamine with similar results expected.

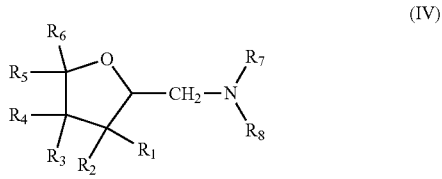

(IV)

wherein R1 to R6 independently are —H or —$C_nH_{2n+1}$ groups, wherein n=1 to 6; and wherein R7 and R8 independently are —$C_nH_{2n+1}$ groups, wherein n=1 to 2.

3. It was found that a polar modifier system that includes DTHFP, ETE, TMEDA and/or tetrahydrofurfuryl-N,N-dimethylamine with BDMAEE and SMT exhibits a number of improvements compared to prior art systems. BDMAEE, which is bis[2-(N,N-dimethylamino)ethyl] ether, is one of many compounds represented by formula (V) below. Although the experimental work has not yet been completed, it is reasonable to believe that many other compounds represented by formula (V), if not all of the compounds, can be substituted for BDMAEE with similar results expected.

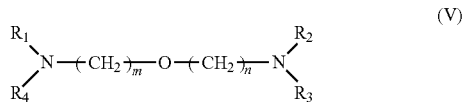

(V)

wherein m=1 to 2, n=1 to 2, and wherein R1 to R4 independently are —$C_nH_{2n+1}$ groups, wherein n=1 to 6.

BRIEF DESCRIPTION OF THE DRAWINGS

A better understanding of the invention can be obtained when the detailed description of exemplary embodiments set forth below is considered in conjunction with the attached drawings in which:

FIG. 1 provides a graphic representation of the molecular structure of several polydiene microstructures;

FIG. 2 provides a graphic representation of the molecular weight distribution for Example 2 and Comparative Examples C1 and C2;

FIG. 3 provides a graphic representation of the molecular weight distribution for Example 3 and Comparative Examples C7 and C8;

FIG. 4 provides a graphic representation of the molecular weight distribution for Examples 13 and 14 and Comparative Examples C11 and C12; and FIG. 5 provides a graphic representation of the molecular weight distribution for Example 15 and Comparative Example C13.

DETAILED DESCRIPTION OF THE EXEMPLARY EMBODIMENTS

The anionically polymerized polymers can be made by any suitable method known in the art, such as those described in U.S. Pat. Nos. 3,281,383 and 3,753,936. In these methods, the anionically polymerized polymers are made by contacting anionically polymerizable monomers with an organolithium compound as an initiator. The preferred class of these compounds can be represented by the formula RLi wherein R is a hydrocarbon radical selected from the group consisting of aliphatic, cycloaliphatic, and aromatic radicals containing from 1 to 20 carbon atoms, although higher molecular weight initiators can be used. Many anionic polymerization initiators are well known and commercially available. Monofunctional organolithium compounds, such as butyllithium, are examples of commonly used initiators. Specific examples of these initiators include methyllithium, ethyllithium, tert-butyllithium, sec-butyllithium, n-butyllithium, n-decyllithium, isopropyllithium, eicosyllithium, cycloalkyllithium compounds, such as cyclohexyllithium, and aryllithium compounds, such as phenyllithium, naphthllithium, p-toluyllithium, 1,1-diphenylhexyllithium, and the like. Monofunctional organolithium compounds substituted with protected polar functional groups may also be used as initiators for anionic polymerization.

The amount of initiator varies depending upon the desired molecular weight of the anionically polymerized polymer. Number average molecular weights between about 20,000 and 500,000 can be obtained by adding about 0.20 to 5.0 millimoles of the RLi initiator per mole of monomers corrected by the factor 100/(MW of monomer).

Multifunctional organolithium initiators may also be used as initiators to prepare branched and radial copolymers with a desired functionality range of 2 to about 30 anionically polymerized polymers chains per initiator molecule. Multifunctional organolithium initiators are readily prepared by direct addition reaction of a stoichiometric amount of a monofunctional organolithium compound to a polyvinyl compound such as 1,3-diisopropenyl benzene, 1,3,5-triisopropenyl benzene, 1,3-bis(1-phenylethenyl)benzene, 1,3,5-tris(1-phenylethenyl)benzene, 1,3-divinylbenzene, 1,3,5-trivinylbenzene, and the like. Oligomeric polyvinyl compounds may be used to prepared multifunctional organolithium initiators with high functionality. Monofunctional organolithium compounds, such as butyllithium, are examples of commonly used initiators for the above addition reaction. Specific examples of these commonly used initiators include tert-butyllithium, sec-butyllithium, and n-butyllithium. Monofunctional organolithium compounds substituted with protected polar functional groups may also be used to prepare multifunctional organolithium initiators. Multifunctional organolithium compounds may be combined among them and/or with monofunctional organolithium compounds to partially initiate anionic polymerization with the multifunctional organolithium compound. The partial initiation is achieved by controlling the stoichiometric ratio of multifunctional initiator to monofunctional initiator.

Anionic polymerization is typically carried out in inert hydrocarbon solvents at relatively low temperatures under vacuum or an inert atmosphere with highly purified reagents in order to prevent the premature termination of the polymerization reaction. The anionic polymerization reactions may take place in a variety of organic solvents. Examples of suitable solvents include, but are not limited to, pentane, hexane, heptane, octane, cyclopentane, cyclohexane, cycloheptane, benzene, naphthalene, toluene, xylene, methyl ether, methyl ethyl ether, diethyl ether, tetrahydrofuran, acetone, methyl ethyl ketone, and mixtures thereof. Cyclohexane in particular, is well suited for use as the solvent in anionic polymerizations.

The anionic polymerization is normally carried out at temperatures in the range from −100° C. to 150° C., preferably between −75° C. and 75° C. Normally 50 to 90% by weight of a reaction solvent is used to control the viscosity inside the reaction zone, preferably 70 to 85%. Typical residence times for anionic polymerization vary depending on the reaction temperature and initiator level between 0.1 and 5 hours, preferable from 0.2 to 2 hours.

Suitable conjugated dienes for use in building the anionically polymerized polymers of the present invention include, but are not limited to, 1,3 butadiene, isoprene, 1,3-pentadiene, methylpentadiene, phenylbutadiene, 2,3-dimethyl-1,3-butadiene, 2,4-hexadiene, 1,3-hexadiene, 1,3-cyclohexadiene, 3,4-dimethyl-1,3-hexadiene, 1,3-octadiene, 4,5-diethyl-1,3-octadiene, myrcene, farnesene and the like. Other anionically polymerizable monomers that may be used in the production of the anionically polymerized polymers include, but are not limited to, monovinyl aromatic monomers, such as styrene and styrene derivatives including 3-methylstyrene, α-methyl styrene, p-methyl styrene, α,4-dimethylstyrene, t-butyl styrene, o-chlorostyrene, 2-butenyl naphthalene, 4-t-butoxystyrene, 3-isopropenyl biphenyl, 4-vinylpyridine, 2-vinylpyridine and isopropenyl naphthalene, 4-n-propylstyrene. Functionalized conjugated diene monomers and functionalized monovinyl aromatic monomers that may be used in the production of the anionically polymerized polymers include, but are not limited to, silylated monomers, and the like.

In some embodiments of the methods provided here, the anionically polymerized polymers undergo total or partial coupling to prepare branched and radial anionically polymerized polymers. Partial coupling means that a portion of the total living anionically polymerized polymer chain-ends undergo coupling with coupling agents. The coupling agents desirably couple between 2 and 30 anionically polymerized polymer chains, although coupling agents capable of coupling a greater number of chains may also be employed. Suitable coupling agents for use in the total or partial coupling step include, but are not limited to, epoxidized soybean oil, divinylbenzene, tin halides, silicon halides, functionalized tin compounds, functionalized silicon compound such as a silane compound and functionalized oligomeric compounds such as the ones listed in U.S. Pat. No. 7,517,934. The entire disclosure of U.S. Pat. No. 7,517,934 is incorporated herein by reference. Silicon tetrachloride and tin tetrachloride are specific examples of suitable coupling agents, with silicon tetrachloride being particularly well-suited for this application. The partial coupling is achieved by controlling the stoichiometric ratio of coupling agent to living polymer. The partial coupling may provide a polymer blend with desired properties.

Organometallic compounds of different metals from Groups IIa, IIb and IIIa, including magnesium, zinc and aluminum, may be used as polymerization rate modifiers when mixed with alkyllithium initiators. Specific examples of suitable polymerization rate modifiers are dibutyl magnesium, diethyl zinc and triethyl aluminium. The polymerization rate modifiers may be used to control the temperature profile of polymerization. The polymerization rate modifiers contribute to control a polymerization step in either isothermal mode for a pre-established residence time or quasi-adiabatic mode up to a peak temperature.

In some embodiments of the methods provided here, the anionically polymerized polymers are polymerized in batch, programmed-batch and/or semi-batch processes. In additional embodiments of the methods of the present invention, the anionically polymerized polymers may be prepared in continuous and/or semi-continuous mode. The anionic polymerization of the anionically polymerized polymers may take place in situ i.e., in a single reaction zone, or may take place in multiple reaction zones. The former design tends to favor faster reactions while the latter design may be preferred when specially controlled polymerization reactions are desired. In some embodiments, a reaction apparatus having two or more reaction zones (e.g., reaction chambers) may be employed.

As one of skill in the art would recognize, the described synthesis of the anionically polymerized polymers can occur in a reaction setting comprising either a batch, a semi-continuous or a continuous process operated at temperatures, solvent ratios and stream flow rates necessary to reach the described residence time and stoichiometry conditions.

The following examples have the purpose of showing the features of the present invention and are not intended to limit the scope thereof. Comparative examples using previous art technologies are included as reference. Characterization of copolymer microstructure was performed by 300 MHz $^1$H-NMR technique, and molecular weight characterization using GPC with 3-column set, coupled to differential refractive index detector. Peak molecular weights and polydispersity indexes Mw/Mn reported are referred to calibration curve based on polystyrene standards with narrow molecular weight distribution.

Example 1

Uncoupled SBS block copolymer using preferred polar modifier system of invention: High polar modifier system concentration, high molecular weight copolymer synthesis at low temperature range.

Cyclohexane (5383 g) was charged in to a 7.6-liter stainless steel reactor under inert nitrogen atmosphere. Solvent temperature was stabilized in the reactor at 18.1° C. (Tst1) by means of water circulation through reactor internal coil. Thereafter BDMAEE, DTHFP, n-butyllithium initiator (nBuLi) initiator and SMT were added in the listed order. DTHFP, BDMAEE and SMT molar ratios relative to active lithium content were 4.17, 0.52 and 0.10, respectively. Styrene (84.5 g) was feed to the reactor at a rate adequate to complete its charge in 0.5 minutes. Circulation of water at controlled temperature was continued along first styrene block polymerization. Reactor temperature reached a peak temperature of 19.7° C. in 3 minutes, and a wait time of 2 minutes was practiced, therefore first block homopolymerization time was 5 min (tSt). Then reactor cooling was terminated and immediately after butadiene (344.7 g) was fed in a period of about 2 minutes. Temperature right at the start of butadiene feed was 19.2° C. (Ti-Bd). Butadiene polymerization reached a peak temperature of 43° C. (Tp-Bd), 9 minutes after beginning butadiene loading (tp-Bd). In every case butadiene polymerization occurred without circulation of water thru the jacket. There was a wait time of 3 minutes (twBd) before the second styrene (84.5 g) was fed to reactor. It was detected a peak temperature past 3 minutes of second styrene charge. Past 5 minutes an alcohol was fed to terminate polymer anions. Cyclohexane to overall monomer mass ratio in this procedure was 8. A block copolymer was obtained of following characteristics: Peak molecular weight Mp=277.8 kg/mol, polydispersity index Mw/Mn=1.06, total styrene repeat unit content of 31.9 wt %, random styrene repeat unit content of 3.9 wt %, total vinyl content of 90.9 wt % on a butadiene block basis (1,2-vinyl+ VCP), and of 89.4 mol % on repeat unit basis, VCP content of 3.1 wt %. Molecular weight distribution of this SBS copolymer exhibited a unimodal narrow peak shape.

Example 2

Uncoupled SBS block copolymerization using preferred polar modifier system of invention: Medium polar modifier concentration range, medium molecular weight copolymer synthesis at low temperature range.

The block copolymer was prepared in a 5.3-liter lab scale batch thru the following steps: (1) charge of cyclohexane solvent to a reactor; (2) stabilization of solvent to a temperature Ti; (3) charge of polar modifiers BDMAEE and DTHFP; (4) charge of n-butyllithium; (5) charge of SMT; (6) charge of styrene monomer; (7) immediate interruption of reactor temperature control to perform polymerization in absence of external cooling or external heating, apart from natural heat loss to the environment (8) homopolymerization of first styrene block for a period of time tSt1, where heat of polymerization gradually raised reactor temperature without detection of temperature drop that evidenced a peak temperature during such period; (9) registration of reactor temperature TiBd and immediate charge of butadiene monomer; (10) butadiene block copolymerization, where heat of reaction raised reactor temperature to a peak temperature TpBd which was registered, as well as time tpBd elapsed from beginning of butadiene charge to the moment TpBd occurred; (11) wait time twBd; (12) charge of second styrene load; (13) polymerization of second polystyrene block until full consumption of styrene monomer; (14) charge of excess equivalents of an alcohol to assure termination of all polymer anions. In this formulation 2938 g of cyclohexane were used, 60.9 g of styrene were used to build polystyrene first block, 246.1 g of butadiene were used to build high vinyl polybutadiene middle block, and 60.9 g of styrene were used to build polystyrene end block. Thus, overall solvent to monomer ratio (S/M) was 8.0. Feed time of each styrene load was 0.5 minutes long. Feed time for butadiene load was 2 minutes long. Active n-butyllithium charge was 4.2 mmol. DTHFP, BDMAEE and SMT molar ratios relative to active lithium content were 2.13, 0.27 and 0.05, respectively (See Table 1). First styrene charge was homopolymerized for 3 minutes, from a starting temperature of 10.8° C. to reach 15.0° C. High vinyl polybutadiene block polymerization evolved from a temperature of 15 to a peak temperature of 46.7° C. in 11 minutes (See Table 2). A block copolymer was obtained of following characteristics: total styrene repeat unit content of 34.6 wt %, random styrene repeat unit content of 3.3 wt %, total vinyl content of 87.6 wt % on a butadiene block basis (1,2-vinyl+VCP), total vinyl content of 85.8 mol % on repeat unit basis, VCP content of 3.7 wt % on a butadiene block basis. (See Table 3) Molecular weight distribution of this SBS copolymer exhibited a unimodal narrow peak shape, with molecular weight Mp=142.3 kg/mol and polydispersity index Mw/Mn=1.03; (See Table 4).

Comparative example C1: Uncoupled SBS block copolymerization using polar modifier systems of closest prior art, BDMAEE/SMT at low temperature range.

A block copolymer was prepared in the same 5.3-liter reactor of Example 2. Same procedure of example 2, as well as same amounts of cyclohexane, butadiene and styrene charges were employed. Prior art polar modifier system BDMAEE/SMT was evaluated. As in example 2, BDMAEE was fed before n-butyllithium initiator and SMT was fed after n-butyllithium. Active n-butyllithium charge was 4.4 mmol BDMAEE and SMT molar ratios relative to active lithium content were 0.59 and 0.05, respectively (See Table 1). First styrene charge homo-polymerization took 11 minutes to reach 15.0° C. from a starting temperature of 10.7° C. High vinyl polybutadiene block polymerization evolved from a temperature of 15° C. to a peak temperature of 46.0° C. in 17 minutes (See Table 2). A block copolymer was obtained of following characteristics: total styrene repeat unit content of 33.7 wt %, random styrene repeat unit content of 4.3 wt %, total vinyl content of 90.6 wt % on a butadiene block basis (1,2-vinyl+VCP), total vinyl content of 88.7 mol % on repeat unit basis, VCP content of 3.8 wt % on a butadiene block basis. (See Table 3) Molecular weight distribution of this SBS copolymer exhibited a bimodal shape, with a main peak at a molecular weight Mp=123.7 kg/mol, and secondary peak at $Mp_2$=178.9 kg/mol, with a polydispersity index Mw/Mn=1.08; (See Table 4 and FIG. 2). Total vinyl content of the SBS obtained in this comparative example almost reached the 90.9 wt % level obtained in invention Example 1. Random styrene content ratio to total styrene content was also very alike, to what was obtained in example 1: about 12.8% of the styrene was randomized with butadiene and 87.2% became part of polystyrene blocks in comparative example using BDMAEE/SMT system, whereas 12.2% random and 87.8% in form of block in invention Example 1. Nevertheless, this comes at expense of un-acceptable attributes in the comparative product: bimodal and wide molecular weight distribution in comparative example 1 is a sign of premature termination of the polymer anions; thus, copolymer produced very likely consist of a blend of low molecular weight di-block copolymer, SB, that stop propagating prematurely and high molecular weight SBS with un-symmetrical size of polystyrene blocks. Both factors compromise mechanical properties of the copolymer. The polymerization also becomes disadvantageously slow with this comparative polar modifier system: it took 15 minutes to polymerize first styrene block in the comparative example 1, while 3 minutes in invention Example 2; butadiene polymerization is also slower with BDMAEE/SMT system, it took 17 minutes to reach peak temperature in the comparative example, when for the same temperature rise 11 minutes were required with invention system in example 2.

Comparative example C2: Uncoupled SBS block copolymerization using polar modifier systems of closest prior art, BDMAEE/SMT at low temperature range. As in example 2, BDMAEE was fed before n-butyllithium initiator and SMT was fed after n-butyllithium. Active n-butyllithium charge was 4.4 mmol. BDMAEE and SMT molar ratios relative to active lithium content were 0.36 and 0.05, respectively (See Table 1). After 15 minutes of first styrene block homo-polymerization reactor temperature barely reached 13.6° C. from a starting temperature of 10.5° C. High vinyl polybutadiene block polymerization evolved from a temperature of 13.6° C. to a peak temperature of 41.2° C. in 42 minutes (See Table 2). A block copolymer was obtained of following characteristics: total styrene repeat unit content of 34.9 wt %, random styrene repeat unit content of 10.6 wt %, total vinyl content of 87.0 wt % on a butadiene block basis (1,2-vinyl+VCP), total vinyl content of 85.0 mol % on repeat unit basis, VCP content of 4.2 wt % on a butadiene basis. (See Table 3) Molecular weight distribution of this SBS copolymer exhibited a unimodal peak slightly skewed towards low molecular weight range, with a main peak at a molecular weight Mp=154.5 kg/mol and a polydispersity index Mw/Mn=1.05; (See Table 4 and FIG. 2). The main change in Comparative Example C2 vs. Comparative Example C1 was a reduction of BDMAEE molar ratio to active nBuLi from 0.59 to 0.36, while SMT/nBuLi molar ratio remained at 0.05. This reduced the vinyl content from 90.6 in Comparative Example C1 to 87.0 in Comparative Example C2. The effect in reduction of vinyl content was very alike to the effect of reducing by half the dosage of ternary polar modifier system of invention from a DTHFP/BDMAEE/SMT/nBuLi molar ratio of 4.17/0.52/0.1/1 in invention Example 1 to 2.13/0.27/0.05/1 in invention Example 2, with an associated drop of 90.9 wt % total vinyl to 87.6 wt %, respectively. Molecular weight distribution improved in Comparative Example C2 vs. Comparative Example C1, as bimodality was avoided, but still some skewedness in the distribution evidenced some premature polymer anion termination. As can be seen in FIG. 2, molecular weight distribution of SBS obtained with polar modifier DTHFP/BDMAEE/SMT in invention Example 1 was more narrow and symmetrical than that of copolymer produced in Comparative Example C2. The most deleterious effect of the slight reduction of BDMAEE content in Comparative Example C2 recipe was in polymerization speed and in randomized styrene content: in Comparative Example C2 time allowed for first styrene block homo-polymerization was increased by a factor of 5 in comparison of time needed in invention Example 2, and even this was not enough to reach the 15° C. target expected. Butadiene polymerization in Comparative Example C2 was also very slow, it was required 42 minutes to reach butadiene peak temperature, whereas in invention Example 2 only 11 minutes were needed. Although a longer wait time after butadiene peak temperature was allowed in Comparative Example C2 before feeding second styrene load than in invention Example 2, being 5 and 2 minutes, respectively, randomized styrene was very high: 30.4% of the styrene was randomized only 69.6% became part of the polystyrene blocks, whereas in invention Example 2 only 9.5% of the styrene became randomized (calculated as random styrene content on a SBS basis over total styrene contents on a SBS basis).

A block copolymer was prepared in the same 5.3-liter reactor of Example 2. Same procedure of example 2, as well as same amounts of cyclohexane, butadiene and styrene charges were employed. Prior art polar modifier system BDMAEE/SMT was evaluated at lower dosage than in Comparative example C1.

TABLE 1

Initiator and polar modifier system loadings in examples 1 and 2, according with the invention, and comparative examples C1 thru C6, using previous art.

| Example | n-BuLi, mmol active | DTHFP, mol/Li mol | BDMAEE, mol/Li mol | SMT, mol/Li mol | TMEDA, mol/Li mol | DMTHFMA, mol/Li mol | ETE, mol/Li mol |
|---|---|---|---|---|---|---|---|
| 1 | 3.1 | 4.17 | 0.52 | 0.10 | 0 | 0 | 0 |
| 2 | 4.2 | 2.13 | 0.27 | 0.05 | 0 | 0 | 0 |
| C1 | 4.4 | 0 | 0.59 | 0.05 | 0 | 0 | 0 |
| C2 | 4.4 | 0 | 0.36 | 0.05 | 0 | 0 | 0 |
| C3 | 4.3 | 3.11 | 0 | 0 | 0 | 0 | 0 |
| C4 | 4.9 | 0 | 0 | 0 | 0 | 0 | 9.3 |
| C5 | 4.0 | 0 | 0 | 0.12 | 4.5 | 0 | 0 |
| C6 | 4.6 | 0 | 0 | 0.10 | 0 | 3.9 | 0 |

TABLE 2

Polymerization process parameters in examples 1 and 2, according with the invention, and comparative examples C1 thru C6, using previous art.

| Example | Ti, ° C. | tSt, min | Ti-Bd, ° C. | Tp-Bd, ° C. | tpBd, min | twBd, min |
|---|---|---|---|---|---|---|
| 1 | 18.1 | 5 | 19.2 | 43 | 9 | 3 |
| 2 | 10.8 | 3 | 15.0 | 46.7 | 11 | 2 |
| C1 | 10.7 | 11 | 15.0 | 46.0 | 17 | 5 |
| C2 | 10.5 | 15 | 13.6 | 41.2 | 42 | 5 |
| C3 | 10.8 | 5 | 14.9 | 44.6 | 21 | 11 |
| C4 | 10.3 | 12 | 14.3 | 44.0 | 18 | 7 |
| C5 | 10.7 | 4 | 15.0 | 47.6 | 14 | 11 |
| C6 | 10.9 | 3 | 15.1 | 48.7 | 9 | 5 |

TABLE 3

NMR characterization of SBS copolymer produced in in examples 1 and 2, according with the invention, and comparative examples C1 thru C6, using previous art.

| Example | Total Styrene, wt % | Block styrene, wt % | Random styrene, wt % | 1,2-vinyl, wt %, Bd basis | VCP, wt %, Bd basis | Total vinyl, 1,2 + VCP, wt %, Bd basis | Total vinyl, 1,2 + VCP, mol %, Bd basis |
|---|---|---|---|---|---|---|---|
| 1 | 31.9 | 28.0 | 3.9 | 87.8 | 3.1 | 90.9 | 89.4 |
| 2 | 34.6 | 31.3 | 3.3 | 83.9 | 3.7 | 87.6 | 85.8 |
| C1 | 33.7 | 29.4 | 4.3 | 86.8 | 3.8 | 90.6 | 88.7 |
| C2 | 34.9 | 24.3 | 10.6 | 82.9 | 4.2 | 87.0 | 85.0 |

TABLE 3-continued

NMR characterization of SBS copolymer produced in in examples 1 and 2, according with the invention, and comparative examples C1 thru C6, using previous art.

| Example | Total Styrene, wt % | Block styrene, wt % | Random styrene, wt % | 1,2-vinyl, wt %, Bd basis | VCP, wt %, Bd basis | Total vinyl, 1,2 + VCP, wt %, Bd basis | Total vinyl, 1,2 + VCP, mol %, Bd basis |
|---|---|---|---|---|---|---|---|
| C3 | 34.0 | 30.2 | 3.8 | 78.2 | 3.0 | 81.2 | 79.7 |
| C4 | 32.9 | 31.4 | 1.5 | 80.2 | 2.4 | 82.6 | 81.4 |
| C5 | 34.8 | 31.7 | 3.1 | 79.1 | 4.2 | 83.3 | 81.2 |
| C6 | 34.2 | 31.2 | 3.0 | 71.5 | 5.1 | 76.6 | 74.1 |

TABLE 4

GPC characterization of SBS copolymer produced in example 1, according with the invention, and comparative examples C1 thru C6, using previous art.

| Example | Mp, kg/mol | Mw/Mn | MWD Shape |
|---|---|---|---|
| 1 | 277.4 | 1.06 | Unimodal narrow peak |
| 2 | 142.3 | 1.03 | Unimodal narrow peak |
| C1 | 123.7 | 1.08 | Bimodal peak, Mp2 = 179 kg/mol |
| C2 | 154.5 | 1.05 | Unimodal peak, slightly skewed towards low MW |
| C3 | 138.5 | 1.03 | Unimodal narrow peak |
| C4 | 123.7 | 1.02 | Unimodal narrow peak |
| C5 | 150.6 | 1.04 | Unimodal narrow peak |
| C6 | 130.3 | 1.04 | Unimodal narrow peak |

FIG. 2. Molecular weight distribution of copolymer produced in example 2, according with invention, and comparative examples C1 and C2, using prior art.

When comparing speed of styrene homopolymerization stage of high vinyl copolymer obtained with polar modifier system of the invention DTHFP/BDMAEE/SMT, used in example 2, against prior art modifier system of prior art based on BDMAEE/SMT, used in comparative examples C1, it can be noticed that temperature rise to 15° C. of first styrene block homopolymerization occurred in almost four times shorter period with invention than with prior art. When comparing time to reach butadiene block stage peak temperature, tpBd, polar modifier of invention tested in example 2 enabled also faster butadiene polymerization than prior art used in example C1. In addition, a shorter wait time twBd was needed with invention polar modifier in example 2 than with prior art practiced in example C1 to obtain lower random styrene content in SBS copolymer. Moreover, in example 1 BDMAEE/Li ratio was half of that used in comparative example C1.

When comparing molecular weight distribution obtained with polar modifier of invention DTHFP/BDMAEE/SMT, used in example 2, against prior art based on polar modifier system BDMAEE/SMT, of comparative example C1, it can be noticed that an unimodal narrow peak was obtained with invention, whereas a wide bimodal peak was obtained with prior art (see FIG. 2). Unimodal narrowly distributed molecular weight distribution obtained with polar modifier of invention in example 2 confirms that most of SBS copolymer molecules so produced grew to the same average molecular weight, and very likely as symmetrical S-b-B-b-S copolymer. Bimodal and wide molecular weight distribution obtained with prior art is explained by premature termination of polymer anions along polymerization: copolymer chains that fall in the lower molecular weight range of the bimodal distribution are prone to lack incorporation of polystyrene end block, while those that fall in the high molecular weight range of the distribution are prone to have a longer polystyrene end block than their firstly incorporated polystyrene block. Then, product of comparative example C1 is expected to be a blend with more than 50 wt % of S-b-B di-block copolymer and less than 50 wt % of un-symmetrical S-b-B-b-S tri-block copolymer.

In comparative example C2, that evaluated prior art BDMAEE/SMT polar modifier system with a BDMAEE/Li ratio lower than in comparative example C1, but still higher amount of BDMAEE than in invention example 2, polymerization proceeded at still lower speed and incorporated much more random styrene repeat units in the copolymer. Its molecular weight distribution improved towards a unimodal peak, but still appeared slightly wider than that of invention example 2, and skewed towards low molecular weight range, evidencing some premature termination of polymer anions.

Invention example 2, based on DTHFP/BDAMEE/SMT polar modifier system produced SBS block copolymer with very high level of 1,2-vinyl butadiene repeat units, slightly higher than what obtained in comparative example C2 based on polar modifier system of prior art BDMAEE/SMT. Advantageously, VCP level was slightly lower in invention example 2 than in comparative examples C1 and C2.

When comparing invention example 2, based on DTHFP/BDMAEE/SMT polar modifier system against other prior art polar modifier systems, as DTHFP in comparative example C3, ETE in comparative example C4, TMEDA/SMT in comparative example C5 and DMTHFMA/SMT in comparative example C6, it can be noticed that invention polar modifier system conducts to faster polymerization than most of prior art polar modifier systems, and just slightly slower than with DMTHFMA/SMT system. Molecular weight distribution unimodality and narrowness of copolymer obtained by invention was competitive with these other polar modifier systems, as reveal by low values of polydispersity index Mw/Mn. Nevertheless, none of these other prior art polar modifier systems was capable of surpassing 1,2-vinyl incorporation level of invention. Moreover, TMEDA/SMT tried in comparative example C5 and DMTHFMA/SMT produced higher levels of VCP than invention example 1.

Examples 3 Thru 8

Uncoupled SBS block copolymerization using preferred polar modifier system invention, at medium temperature range. An S-b-B-b-S type block copolymer was prepared in a lab scale batch reactor thru the following steps: (1) charge of cyclohexane solvent to a reactor; (2) stabilization of solvent to a temperature Ti; (3) charge of polar modifiers BDMAEE and DTHFP; (4) charge of n-butyllithium; (5) charge of SMT; (6) charge of styrene monomer; (7) immediate interruption of reactor temperature control to perform polymerization in absence of external cooling or heating, apart from natural heat loss to the surroundings (8) homopolymerization of first styrene block, where heat of polymerization gradually raised reactor temperature up to a peak temperature TpSt at a time tpSt elapsed from beginning of styrene charge and such peak temperature; (9) a wait time of 10 minutes past TpSt, where a slight temperature drop occurred; (10) registration of reactor temperature TiBd and immediate charge of butadiene monomer; (11) butadiene block copolymerization, where heat of reaction raised reactor temperature to a peak temperature TpBd which was registered, as well as time tpBd elapsed from beginning of butadiene charge to the moment TpBd occurred; (12) wait time of 1 minute past TpBd, where a slight temperature drop occurred; (13) charge of second styrene load; (14) polymerization of second polystyrene block until full consumption of styrene monomer; (15) charge of excess equivalents of an alcohol to assure termination of all polymer anions. In this formulation 2795 g of cyclohexane were used, 63.6 g of styrene were used to build polystyrene first block, 246.1 g of butadiene were used to build high vinyl polybutadiene middle block, and 63.6 g of styrene were used to build polystyrene end block. Thus, overall solvent to monomer ratio was 7.5. Feed time of each styrene load was 0.5 minutes long. Feed time for butadiene load was 2 minutes long. Active initiator content and polar modifier molar ratios to initiator are shown in Table 5. High vinyl polybutadiene block was polymerized in a temperature range from 22.8 to 56.8° C. Process parameters Ti, TpSt, tpSt, TiBd, TpBd and tpBd are listed in Table 6. SBS copolymer characterization of product from this example is shown in Table 7 and Table 8.

Examples 9 Thru 11

Uncoupled SBS block copolymerization using alternative polar modifier system invention, at medium temperature range. The same operations listed in examples 3 thru 7 were employed, but DTHFP was replaced by either ETE, TMEDA or DMTHFMA. Active n-butyllithium and polar modifier system dosages for these examples are reported in Table 5. High vinyl polybutadiene block was polymerized in a temperature range from 23 to 59.8° C. Process parameters Ti, TpSt, tpSt, TiBd, TpBd and tpBd are listed in Table 6 for each example. SBS copolymer characterization of products from these examples is shown in Table 7 and Table 8.

Comparative examples C7 and C8. Uncoupled SBS block copolymerization using polar modifier system of closest prior art, at medium temperature range. The same procedure described in examples 3 thru 7 was employed, but DTHFP was avoided. Active n-butyllithium and polar modifier system dosages for these comparative examples are reported in Table 5. High vinyl polybutadiene block was polymerized in a temperature range from 23.5 to 57° C. Process parameters Ti, TpSt, tpSt, TiBd, TpBd and tpBd are listed in Table 6 for each comparative example. SBS copolymer characterization of products from these comparative examples is shown in Table 7 and Table 8.

TABLE 5

Initiator and polar modifier system loadings in example 3 thru 11, according with the invention, and comparative examples C7 and C8, using previous art.

| Example | n-BuLi, mmol active | DTHFP, mol/ Li mol | ETE, mol/ Li mol | TMEDA, mol/ Li mol | DMTHFMA, mol/ Li mol | BDMAEE, mol/ Li mol | SMT, mol/ Li mol |
|---|---|---|---|---|---|---|---|
| 3 | 4.7 | 2.60 | 0 | 0 | 0 | 0.74 | 0.06 |
| 4 | 3.8 | 3.02 | 0 | 0 | 0 | 0.80 | 0.04 |
| 5 | 4.4 | 0.36 | 0 | 0 | 0 | 0.61 | 0.05 |
| 6 | 4.0 | 2.17 | 0 | 0 | 0 | 0.58 | 0.05 |
| 7 | 4.0 | 2.15 | 0 | 0 | 0 | 0.27 | 0.05 |
| 8 | 5.9 | 1.95 | 0 | 0 | 0 | 0.52 | 0.02 |
| 9 | 4.8 | 0 | 2.52 | 0 | 0 | 0.72 | 0.05 |
| 10 | 4.0 | 0 | 0 | 3.03 | 0 | 0.87 | 0.07 |
| 11 | 5.0 | 0 | 0 | 0 | 2.41 | 0.69 | 0.05 |
| C7 | 4.7 | 0 | 0 | 0 | 0 | 0.92 | 0.06 |
| C8 | 4.7 | 0 | 0 | 0 | 0 | 0.74 | 0.06 |

TABLE 6

Polymerization process parameters in example 3 thru 11, according with the invention, and comparative examples C7 and C8, using previous art.

| Example | Ti, ° C. | TpSt, ° C. | tpSt, min | Ti-Bd, ° C. | Tp-Bd, ° C. | tpBd, min |
|---|---|---|---|---|---|---|
| 3 | 18.4 | 23.4 | 7 | 23.0 | 56.8 | 9 |
| 4 | 18.1 | 23.0 | 12 | 22.8 | 55.4 | 11 |
| 5 | 21.5 | 26.3 | 13 | 26.1 | 56.4 | 17 |
| 6 | 20.2 | 25.2 | 9 | 25.0 | 58.7 | 10 |
| 7 | 18.2 | 23.1 | 7 | 22.9 | 55.6 | 12 |
| 8 | 18.1 | 23.0 | 9 | 22.9 | 55.1 | 12 |
| 9 | 18.2 | 23.6 | 4 | 23.2 | 56.5 | 10 |
| 10 | 18.2 | 23.1 | 15 | 23.0 | 58.4 | 7 |
| 11 | 18.8 | 24.3 | 6 | 23.5 | 59.8 | 7 |
| C7 | 18.3 | 23.5 | 15 | 23.5 | 57.0 | 10 |
| C8 | 19.4 | 23.5 | 30 | 23.5 | 55.8 | 13 |

TABLE 7

NMR characterization of SBS copolymer produced in in example 3 thru 11, according with the invention, and comparative examples C7 and C8, using previous art.

| Example | Total Styrene, wt % | Block styrene, wt % | Random styrene, wt % | 1,2-vinyl, wt %, Bd basis | VCP, wt %, Bd basis | Total vinyl, 1,2 + VCP, wt %, Bd basis | Total vinyl, 1,2 + VCP, mol %, Bd basis |
|---|---|---|---|---|---|---|---|
| 3 | 34.3 | 33.3 | 1.0 | 84.1 | 4.7 | 88.8 | 86.5 |
| 4 | 34.9 | 32.8 | 2.1 | 83.3 | 4.2 | 87.5 | 85.4 |
| 5 | 34.3 | 32.7 | 1.6 | 83.5 | 3.7 | 87.2 | 85.3 |
| 6 | 34.1 | 33.1 | 1.0 | 82.7 | 4.6 | 87.3 | 85.0 |
| 7 | 34.2 | 32.5 | 1.7 | 81.9 | 3.9 | 85.7 | 83.9 |
| 8 | 34.3 | 33.2 | 1.1 | 80.9 | 4.2 | 85.1 | 83.0 |
| 9 | 34.6 | 33.6 | 1.0 | 83.4 | 4.1 | 87.5 | 85.5 |
| 10 | 34.9 | 32.5 | 2.3 | 83.3 | 6.8 | 90.1 | 86.7 |
| 11 | 33.0 | 32.5 | 0.5 | 81.9 | 4.6 | 86.4 | 84.2 |
| C7 | 34.1 | 33.1 | 1.0 | 85.5 | 5.0 | 90.5 | 88.0 |
| C8 | 34.3 | 32.6 | 1.7 | 86.2 | 4.1 | 90.4 | 88.3 |

TABLE 8

GPC characterization of SBS copolymer produced in example 3 thru 11, according with the invention, and comparative examples C7 and C8, using previous art.

| Example | Mp, kg/mol | Mw/Mn | MWD Shape |
|---|---|---|---|
| 3 | 129.8 | 1.04 | Unimodal narrow peak |
| 4 | 158.0 | 1.04 | Unimodal narrow peak |
| 5 | 137.6 | 1.06 | Unimodal narrow peak |
| 6 | 151.9 | 1.05 | Unimodal narrow peak |
| 7 | 150.1 | 1.05 | Unimodal narrow peak |
| 8 | 102.2 | 1.03 | Unimodal narrow peak |
| 9 | 125.8 | 1.07 | Unimodal narrow peak |
| 10 | 151.3 | 1.05 | Unimodal narrow peak |
| 11 | 121.5 | 1.04 | Unimodal narrow peak |
| C7 | 129.2 | 1.10 | Bimodal peak, Mp2 = 183.8 kg/mol |
| C8 | 175.7 | 1.08 | Bimodal peak, Mp2 = 132.6 kg/mol |

FIG. 3. Molecular weight distribution of copolymer produced in example 3, according with invention, and comparative examples C7 and C8, using prior art.

In invention examples 3 thru 8, based on polar modifier system DTHFP/BDMAEE/SMT, polar modifier ratios of DTHFP, BDMAEE and SMT relative to active lithium were swept in a wide composition range.

When comparing polymerization speed of invention examples 3 thru 8 based on DTHFP/BDMAEE/SMT against comparative examples C7 and C8 that used prior art BDMAEE/SMT polar modifier systems, most of compositions tried with invention polar modifier system obtained shorter polymerization times to reach first styrene block peak temperature and shorter times to reach butadiene polymerization peak temperature.

Advantageously, molecular weight distributions of invention examples 3 thru 8, based on DTHFP/BDMAEE/SMT polar modifier system, in every case exhibited a narrow unimodal peak shape with low polydispersity index Mw/Mn, whereas comparative compositions C7 and C8, based on prior art BDMAEE/SMT polar modifier system, produced wide bimodal molecular weight distributions with high polydispersity index Mw/Mn. FIG. 3, shows a relevant comparison of this behavior: invention example 3 and comparative example C8 have same active lithium, BDMAEE and SMT contents; incorporation of DTHFP in invention example 3 corrects wide bimodal molecular weight distribution of comparative examples C8. Higher dosage of BDMAEE in comparative example C7 slightly worsen molecular weight distribution widening, as revealed by FIG. 3 and polydispersity index Mw/Mn. Thus, prior art is adversely prone to produce higher contents of undesired di-block S-b-B copolymer and un-symmetrically S-b-B-b-S triblock copolymer than invention compositions.

Invention examples 9 thru 11 show options of appropriate polar modifiers that can replace DTHFP component of DTHFP/BDMAEE/SMT polar modifier system. Namely, systems ETE/BDMAEE/SMT, TMEDA/BDMAEE/SMT and DMTHFMA/BDMAEE/SMT perform as well as DTHFP/BDMAEE/SMT, rendering high speed polymerization of very high vinyl content block copolymers, with unimodal narrow molecular weight distribution. DTHFP/BDMAEE/SMT polar modifier system is a preferred option, as ETE/BDMAEE/SMT conducts to slightly higher polydispersity index Mw/Mn, TMEDA/BDMAEE/SMT lags in styrene homopolymerization step and produces higher VCP contents, while DMTHFMA/BDMAEE/SMT produces slightly lower 1,2-vinyl content. Nevertheless, this alternative invention systems still surpass performance of prior art systems described.

Although block copolymerization was carried out at higher temperature in invention examples 3 thru 11 than in comparative examples C2 thru C6, higher incorporation level of 1,2-vinyl content was obtained with the invention than with prior art also capable of producing narrowly molecular weight distributed SBS copolymer.

Example 12

Uncoupled SBS block copolymerization using preferred polar modifier system invention, at high temperature range. An S-b-B-b-S type block copolymer was prepared in a lab scale stirred batch reactor, with relatively low thermal insulation level, using the following procedure: Cyclohexane (2720 g) was charged in to a stirred reactor under nitrogen atmosphere, and its temperature was stabilized at 43.3° C. (Ti). Thereafter BDMAEE, DTHFP, n-butyllithium initiator and SMT were added to the reactor in the listed order. Active initiator content and polar modifier molar ratios to initiator are shown in Table 9. Then, a first part of styrene monomer (56.4 g) was charged to the reactor. Styrene feed operation was completed in 0.5 minutes. Reactor temperature control was discontinued thereafter, thus polymerization was carried out in the absence of external cooling, nor external heating, apart from heat dissipation to the environment. A peak temperature of 46.2° C. (TpSt1) was detected passed 2 minutes of styrene load (tpSt1). Then, a wait time of 3 minutes was practiced. By then, reactor temperature dropped to 44.2° C. (TiBd) and butadiene (227.5 g) feed operation began. Butadiene charge was completed in 2 minutes. Butadiene heat of polymerization raised reactant mass to a peak temperature of 61.1° C. (TpBd) in a period of 5 minutes (tpBd), counted from start of butadiene feed operation. Then, a wait time of 2 minutes (twBd) was taken between butadiene polymerization peak temperature and the beginning of second styrene load. Second styrene load to reactor (56.4 g) took 30 seconds to get completed. Second styrene load was polymerized for long enough time to be fully consumed, and then an alcohol was feed to reactor to terminate anionic polymer anions. Cyclohexane solvent to overall monomer feed ratio (S/M) in this example was 8. Process parameters Ti, TpSt1, tpSt1, TiBd, TpBd, tpBd and twBd are listed in Table 10. SBS copolymer characterization of product from this example is shown in Table 11 and Table 12.

Comparative Example C9

Uncoupled SBS block copolymerization using polar modifier system of prior art, at high temperature range. An S-b-B-b-S type block copolymer was prepared in a lab scale stirred batch reactor, with relatively low thermal insulation level, using the following procedure: Cyclohexane (2862 g) and styrene monomer (63.0 g) were charged in to a stirred reactor under nitrogen atmosphere, and their temperature was stabilized at a temperature of 39.9° C. (Ti). Thereafter TMEDA, SMT and n-butyllithium initiator were added to the reactor in the listed order, and reactor temperature control was shut off. Active initiator content and polar modifier molar ratios to initiator are shown in Table 9. A peak temperature of 44.5° C. (TpSt1) was detected passed 5 minutes of initiator load (tpSt1). Then reactor was cooled down for 15 minutes to reach a temperature of 28° C. (TiBd). From this point on polymerization continued in absence of intended heating or cooling, apart from heat dissipation to the surroundings. Then butadiene (255.4 g) feed operation began. Butadiene charge was completed in 5 minutes. Butadiene heat of polymerization raised reactant mass to a peak temperature of 62.7° C. (TpBd) in a period of 10 minutes (tpBd), counted from start of butadiene feed operation. Then, a wait time of 5 minutes (twBd) was taken between butadiene polymerization peak temperature and the beginning of second styrene load. Second styrene load to reactor (63.0 g) was let polymerize for long enough time to be fully consumed. Then an alcohol was feed to reactor to terminate anionic polymer anions. Cyclohexane solvent to overall monomer feed ratio (S/M) in this example was 7.5. Process parameters Ti, TpSt1, tpSt1, TiBd, TpBd, tpBd and twbd are listed in Table 10. SBS copolymer characterization of product from this example is shown in Table 11 and Table 12.

TABLE 9

Initiator and polar modifier system loadings, as well as overall solvent to monomer (S/M) ratio in example 12, according with the invention, and in comparative example C9, using previous art.

| Example | n-BuLi, mmol active | DTHFP, mol/ Li mol | BDMAEE, mol/ Li mol | TMEDA, mol/ Li mol | SMT, mol/ Li mol | S/M |
|---|---|---|---|---|---|---|
| 12 | 5.1 | 1.7 | 0.21 | 0 | 0.04 | 8 |
| C9 | 4.8 | 0 | 0 | 3.8 | 0.08 | 7.5 |

TABLE 10

Polymerization process parameters in example 12, according with the invention, and in comparative example C9, using previous art.

| Example | Ti, ° C. | TpSt1, ° C. | tpSt1, min | Ti-Bd, ° C. | Tp-Bd, ° C. | tpBd, min | twBd, min |
|---|---|---|---|---|---|---|---|
| 12 | 43.3 | 46.2 | 2.0 | 44.2 | 61.1 | 5 | 2 |
| C9 | 39.9 | 44.5 | 4.8 | 28 | 62.7 | 10 | 5 |

TABLE 11

NMR characterization of SBS copolymer produced in example 12, according with the invention, and comparative examples C9, using previous art.

| Example | Total Styrene, wt % | Block styrene, wt % | Random styrene, wt % | 1,2-vinyl, wt %, Bd basis | VCP, wt %, Bd basis | Total vinyl, 1,2 + VCP, wt %, Bd basis | Total vinyl, 1,2 + VCP, mol %, Bd basis |
|---|---|---|---|---|---|---|---|
| 12 | 33.5 | 31.1 | 2.4 | 77.9 | 4.0 | 81.9 | 79.9 |
| C9 | 33.0 | 31.8 | 1.2 | 73.1 | 7.8 | 80.9 | 77.1 |

TABLE 12

GPC characterization of SBS copolymer produced in examples 12, according with the invention, and in comparative examples C9, using previous art.

| Example | Mp, kg/mol | Mw/Mn | MWD Shape |
|---|---|---|---|
| 12 | 109.8 | 1.03 | Unimodal narrow peak |
| C9 | 130.7 | 1.04 | Unimodal narrow peak |

Comparison of example 12, based on polar modifier system DTHFP/BDMAEE/SMT against comparative example C9, based on prior art polar modifier system TMEDA/SMT shows that invention polar modifier system conducts to higher 1,2-vinyl and much lower VCP repeat unit incorporation in the polybutadiene block than prior art when performed at high polymerization temperature. Moreover, butadiene polymerization spanned over a 44 to 61° C. temperature range in example 10, which is a more exigent condition (higher average polymerization temperature) than butadiene polymerization spanning in a range from 28 to 62° C. in comparative example C9. Both cases, invention and prior art conducted to unimodal narrow molecular weight distributions.

Comparative Example C10

Uncoupled SBS block copolymerization using polar modifier system of prior art at high concentration, at high temperature range.

TABLE 13

Initiator and polar modifier system loadings, as well as overall solvent to monomer (S/M) ratio in comparative example C10, using previous art.

| Example | BDMAEE, mol/Li mol | Sodium tert-butoxide, mol/Li mol | S/M |
|---|---|---|---|
| C10 | 0.95 | 0.35 | 8 |

TABLE 14

NMR characterization of SBS copolymer produced in comparative example C10, using previous art.

| Example | Total Styrene, wt % | Block styrene, wt % | Random styrene, wt % | 1,2-vinyl, wt %, Bd basis | VCP, wt %, Bd basis | Total vinyl, 1,2 + VCP, wt %, Bd basis | Total vinyl, 1,2 + VCP, mol %, Bd basis |
|---|---|---|---|---|---|---|---|
| C10 | 26.4 | 25.3 | 1.1 | 77.7 | 8.3 | 86.0 | 81.5 |

TABLE 15

GPC characterization of SBS copolymer produced in comparative example C10, using previous art.

| Example | Mp, kg/mol | Mw/Mn | MWD Shape |
|---|---|---|---|
| C10 | 986.6 | 9.47 | Tri-modal wide peak, Mp2 = 16.8 kg/mol Mp3 = 107.1 kg/mol |

Example 13 and 14

Uncoupled SBS block copolymerization using preferred polar modifier system of invention, at low monomer concentration level. An S-b-B-b-S type block copolymer was prepared in a lab scale batch reactor thru the following steps: (1) charge of cyclohexane solvent to a reactor; (2) stabilization of solvent to a temperature Ti; (3) charge of polar modifiers BDMAEE and DTHFP; (4) charge of n-butyllithium; (5) charge of SMT; (6) charge of styrene monomer; (7) immediate interruption of reactor temperature control to perform polymerization in absence of external cooling or heating, apart from natural heat loss to the surroundings (8) homopolymerization of first styrene block for a total time tSt, during which period heat of polymerization gradually raised reactor temperature up to a peak temperature TpSt at a time tpSt elapsed from beginning of styrene charge and such peak temperature; (10) registration of reactor temperature TiBd and immediate charge of butadiene monomer; (11) butadiene block copolymerization, where heat of reaction raised reactor temperature to a peak temperature TpBd which was registered, as well as time tpBd elapsed from beginning of butadiene charge to the moment TpBd occurred; (12) wait time of twBd past TpBd, where a slight temperature drop occurred; (13) charge of second styrene load; (14) polymerization of second polystyrene block until full consumption of styrene monomer; (15) charge of excess equivalents of an alcohol to assure termination of all polymer anions. In these formulations 2805 g of cyclohexane were used, 41.8 g of styrene were used to build polystyrene first block, 171.1 g of butadiene were used to build high vinyl polybutadiene middle block, and 41.8 g of styrene were used to build polystyrene end block. Thus, overall solvent to monomer ratio was 11.0. Feed time of each styrene load was 0.5 minutes long. Feed time for butadiene load was 2 minutes long. Active initiator content and polar modifier molar ratios to initiator are shown in Table 16. Process parameters Ti, TpSt, tpSt, tSt TiBd, TpBd, tpBd and twBd are listed in Table 17. SBS copolymer characterization of product from this example is shown in Table 18 and Table 19.

Comparative examples C11 and C12. Uncoupled SBS block copolymerization using polar modifier system of prior art, at low monomer concentration level: The same steps of procedure described in examples 10 and 11 were employed, but usage of DTHFP was avoided. In these formulations 4228 g of cyclohexane were used, 68.2 g of styrene were used to build polystyrene first block, 287.7 g of butadiene were used to build high vinyl polybutadiene middle block, and 68.2 g of styrene were used to build polystyrene end block. Thus, overall solvent to monomer ratio was 10.0. Active n-butyllithium and polar modifier system dosages for these comparative examples are reported in Table 16. Process parameters Ti, TpSt, tpSt, tSt, TiBd, TpBd and tpBd are listed in Table 17 for each comparative example. SBS copolymer characterization of products from these comparative examples is shown in Table 18 and Table 19.

TABLE 16

Initiator and polar modifier system loadings, as well as overall solvent to monomer (S/M) ratio in examples 13 and 14, according with the invention, and in comparative examples C11 and C12, using previous art.

| Example | n-BuLi, mmol active | DTHFP, mol/Li mol | BDMAEE, mol/Li mol | SMT, mol/Li mol | S/M |
|---|---|---|---|---|---|
| 13 | 3.5 | 3.5 | 0.44 | 0.09 | 11 |
| 14 | 3.2 | 2.0 | 0.49 | 0.05 | 11 |
| C11 | 4.7 | 0 | 1.09 | 0.12 | 10 |
| C12 | 5.2 | 0 | 0.49 | 0.11 | 10 |

TABLE 17

Polymerization process parameters in examples 13 and 14, according with the invention, and in comparative examples C11 and C12, using previous art.

| Example | Ti, °C. | TpSt, °C. | tpSt, min | tSt, min | Ti-Bd, °C. | Tp-Bd, °C. | tpBd, min | twBd, min |
|---|---|---|---|---|---|---|---|---|
| 13 | 34.1 | 36.0 | 2 | 13 | 33.6 | 46.2 | 5 | 5 |
| 14 | 30.6 | 32.3 | 2 | 14 | 30.7 | 39.4 | 8 | 11 |
| C11 | 19.8 | 22.6 | 10 | 15 | 22.5 | 40.0 | 8 | 9 |
| C12 | 19.8 | N.D. | N.D. | 20 | 22.8 | 34.3 | 21 | 5 |

N.D. = Not detected

TABLE 18

NMR characterization of SBS copolymer produced in examples 13 and 14, according with the invention, and comparative examples C11 and C12, using previous art.

| Example | Total Styrene, wt % | Block styrene, wt % | Random styrene, wt % | 1,2-vinyl, wt %, Bd basis | VCP, wt %, Bd basis | Total vinyl, 1,2 + VCP, wt %, Bd basis | Total vinyl, 1,2 + VCP, mol %, Bd basis |
|---|---|---|---|---|---|---|---|
| 13 | 33.3 | 31.8 | 1.5 | 84.0 | 4.7 | 88.6 | 86.4 |
| 14 | 33.9 | 31.6 | 2.3 | 84.0 | 3.8 | 87.8 | 85.9 |
| C11 | 31.9 | 30.5 | 1.4 | 86.8 | 5.1 | 91.9 | 89.4 |
| C12 | 30.9 | 21.0 | 9.9 | 88.2 | 2.1 | 90.3 | 89.2 |

TABLE 19

GPC characterization of SBS copolymer produced in examples 13 and 14, according with the invention, and in comparative examples C11 and C12, using previous art.

| Example | Mp, kg/mol | Mw/Mn | MWD Shape |
|---|---|---|---|
| 13 | 118.5 | 1.05 | Unimodal narrow peak |
| 14 | 129.1 | 1.05 | Unimodal narrow peak |
| C11 | 149.6 | 1.06 | Big shoulder at 121 kg/mol |
| C12 | 135.5 | 1.05 | Unimodal narrow peak |

FIG. 4. Molecular weight distribution of copolymer produced in examples 13 and 14, according with invention, and comparative examples C11 and C12, using prior art.

Analysis of examples 13 and 14, based on invention polar modifier system DTHFP/BDMAEE/SMT, shows that those where robust against lower monomer concentration during polymerization, producing high 1,2-vinyl and low VCP repeat unit contents in polybutadiene block, at high polymerization rate of styrene and butadiene blocks and with narrow unimodal molecular weight distribution in final product. On the other hand, employing prior art polar modifier system BDMAEE/SMT with polymerization at diluted monomer regime, conducted to bimodal weight distribution when BDMAEE/Li ratios was high, or to very slow polymerization rate and very high level of random styrene incorporation in the copolymer when BDMAEE/Li was low.

Examples 15 and 16

SB block copolymerization using preferred polar modifier system followed by coupling step. (S-b-B)$_n$—X type copolymers were prepared in a lab scale stirred reactor using the following procedure: Cyclohexane (2792 g) was charged in to a stirred reactor under nitrogen atmosphere, and its temperature was stabilized at approximately 18° C. (Ti). Thereafter BDMAEE, DTHFP, n-butyllithium initiator and SMT were added to the reactor in the listed order. Active initiator content and polar modifier molar ratios to initiator are shown in Table 20. Then, styrene monomer (63.6 g) was charged to the reactor. Styrene feed operation was completed in 30 seconds. Reactor cooling was interrupted thereafter. It was registered a peak temperature (TpSt) for first styrene homo-polymerization stage as well as reaction time (tpSt) elapsed from beginning of first styrene load up to such moment. Then, a wait time of 10 minutes was practiced in both examples. Immediately afterwards reactor temperature was registered (Ti-Bd) and butadiene (246.1 g) feed operation began. Butadiene charge was completed in 2 minutes. Butadiene heat of polymerization raised reactant temperature, and when it reached 55.8±0.3° C. (TSiCl4) a shot of silicon tetrachloride coupling agent was fed to the reactor. Dosage of silicon tetrachloride (SiCl4) is shown in Table 20. Record was taken of butadiene reaction time up to coupling agent shot (tSiCl4), counted from start of butadiene feed operation. An alcohol solution shot, with hydroxyl equivalents in excess to n-butillithium initially fed to reactor, was fed to the reactor 6 minutes after SiCl$_4$ shot. Cyclohexane to overall monomer feed ratio in these examples was 9.0. Process parameters Ti, TpSt, tpSt, TiBd, and tSiCl4 are listed in Table 21. SBS copolymer characterization of product from this example is shown in Table 22 and Table 23.

Comparative examples C13 and C14, using prior art. The same polymerization procedure as in examples 15 and 16 was performed, but polar modifier system lacked DTHFP. Active initiator content, polar modifier molar ratios to initiator, and silicon chloride dosage are shown in Table 20. Process parameters Ti, TpSt, tpSt, TiBd and tSiCl4 are listed in Table 21. SBS copolymer characterization of product from this example is shown in Table 22 and Table 23.

TABLE 20

Initiator, polar modifier system, and coupling agent loadings in examples 15 and 16, according with the invention, and comparative examples C13 and C14, using previous art.

| Example | n-BuLi, mmol active | DTHFP, mol/Li mol | BDMAEE, mol/Li mol | SMT, mol/Li mol | SiCl$_4$, mmol |
|---|---|---|---|---|---|
| 15 | 4.5 | 2.7 | 0.76 | 0.06 | 1.09 |
| 16 | 4.8 | 2.5 | 0.71 | 0.05 | 1.16 |
| C13 | 4.5 | 0 | 0.76 | 0.06 | 1.09 |
| C14 | 4.5 | 0 | 0.96 | 0.06 | 1.09 |

TABLE 21

Polymerization process parameters in examples 15 and 16, according with the invention, and comparative examples C13 thru C14, using previous art.

| Example | Ti, °C. | TpSt, °C. | tpSt, min | TiBd, °C. | TSiCl4, °C. | tSiCl4, min |
|---|---|---|---|---|---|---|
| 15 | 18.1 | 23.1 | 7.0 | 22.8 | 56.0 | 6.7 |
| 16 | 18.1 | 23.1 | 7.5 | 22.9 | 55.9 | 6.9 |
| C13 | 18.3 | 23.4 | 28.0 | 23.4 | 55.5 | 13.0 |
| C14 | 18.3 | 23.4 | 17.0 | 23.2 | 56.1 | 9.5 |

TABLE 22

NMR characterization of SBS copolymer produced in examples 15 and 16, according with the invention, and in comparative examples C13 and C14, using previous art.

| Example | Total Styrene, wt % | Block styrene, wt % | Random styrene, wt % | 1,2-vinyl, wt %, Bd basis | VCP, wt %, Bd basis | Total vinyl, 1,2 + VCP, wt %, Bd basis | Total vinyl, 1,2 + VCP, mol %, Bd basis |
|---|---|---|---|---|---|---|---|
| 15 | 21.2 | 20.9 | 0.3 | 85.9 | 3.4 | 89.4 | 87.7 |
| 16 | 21.2 | 20.9 | 0.3 | 85.8 | 3.5 | 89.2 | 87.5 |
| C13 | 21.5 | 21.2 | 0.3 | 86.5 | 3.8 | 90.2 | 88.4 |
| C14 | 21.7 | 21.4 | 0.2 | 86.2 | 4.0 | 90.2 | 88.2 |

TABLE 23

GPC characterization of SBS copolymer produced in examples 15 and 16, according with the invention, and in comparative examples C13 thru C14, using previous art.

| Example | $Mp_{uc}$, kg/mol | Coupled SBS copolymer, wt % |
|---|---|---|
| 15 | 119.7 | 79.9 |
| 16 | 111.9 | 85.3 |
| C13 | 127.1 | 44.7 |
| C14 | 118.1 | 51.5 |

$Mp_{uc}$ = Peak molecular weight of un-coupled fraction.

FIG. 5. Molecular weight distribution of copolymer produced in example 15, according with invention, and comparative example C13, using prior art.

When comparing coupling efficiency and molecular weight distribution obtained with polar modifier of invention DTHFP/BDMAEE/SMT, used in example 15 and 16, against such parameters when using prior art based on polar modifier system BDMAEE/SMT, as in comparative examples C13 and C14, it can be evidenced that invention polar modifier system provides livingness to much higher amount of polymer anions up to end of butadiene consumption than closest prior polar modifier system does. $SiCl_4$ load was planned for a theoretical maximum coupling efficiency of 95% to 96% if every polymer anion would remain alive when $SiCl_4$ charge occurred. In comparative examples C13 and C14 about half of polymeric anions were unable to participate in the coupling reaction, confirming that about half of polymeric anions had terminated before SiCl4 charge. It is worthwhile to notice that cyclohexane, styrene and butadiene loadings of these examples agreed with cyclohexane, first styrene and butadiene loadings of Example 3 thru 11 and comparative examples C7 and C8. Therefore, livingness of polymer anions up to the end of butadiene consumption evidenced in examples 15 and 16 applies to examples 3 thru 11, that shared preferred polar modifier system DTHFP/BDMAEE/SMT and obtained unimodal narrow molecular weight distributed un-coupled SBS product. On the other hand, same degree of premature termination of polymer anions evidenced in comparative examples C13 and C14 applies for comparative examples C7 and C8, all of them using closest prior art system BDMAEE/SMT, and showing wide bimodal molecular weight distributions.

Example 17 (Hypothetical)

Linear SBS block copolymer of example 2 synthesized using preferred polar modifier system of this invention, further hydrogenated to obtain a linear high vinyl SEBS.

Linear SBS from example 2 exhibiting 87.6 wt % total vinyl content and still dissolved in cyclohexane (solvent to polymer ratio 8.0, w/w) was deactivated by adding 2-methyl-2,4-pentanediol in a molar ratio alcohol/Li active=0.5. Thereafter polymer solution was heated up to 90° C. and 0.25 mmol of hydrogenation catalyst ($Cp_2$ Ti(PhOCH$_3$)$_2$ or $Cp_2$ Ti ($CH_2$ PPh$_2$) as described in U.S. Pat. No. 5,985,995A) per 100 g of polymer were added, followed by hydrogen addition up to a pressure of 8 kg/cm$^2$ was reached. Hydrogen uptake was completed in 45 minutes. $^1$H NMR analysis, showed it was obtained a SEBS having 99.6% hydrogenation. Therefore, a novel linear SEBS derived from a SBS having 87.6 wt % vinyl content was thus obtained.

Example 18 (Hypothetical)

Linear SBS block copolymer of example 10 synthesized using preferred polar modifier system of this invention, further hydrogenated to obtain a linear high vinyl SEBS.

Linear SBS from example 10 exhibiting 90.1 wt % total vinyl content and still dissolved in cyclohexane (solvent to polymer ratio 7.5, w/w) was deactivated by adding 2-methyl-2,4-pentanediol in a molar ratio alcohol/Li active=0.5. Thereafter polymer solution was heated up to 90° C. and 0.25 mmol of hydrogenation catalyst ($Cp_2$ Ti(PhOCH$_3$)$_2$ or $Cp_2$ Ti ($CH_2$ PPh$_2$) as described in U.S. Pat. No. 5,985,995A) per 100 g of polymer were added, followed by hydrogen addition up to a pressure of 8 kg/cm$^2$ was reached. Hydrogen uptake was completed in 45 minutes. $^1$H NMR analysis revealed it was obtained a SEBS having 99.6% hydrogenation. Therefore, a novel linear SEBS derived from a SBS having 90.1 wt % vinyl content was thus obtained.

Example 19 (Hypothetical)

Star-type SBS block copolymer of example 15 synthesized using preferred polar modifier system of this invention, further hydrogenated to obtain star-type high vinyl SEBS.

Star-type SBS block copolymer from example 15 exhibiting 89.4 wt % total vinyl content and still dissolved in cyclohexane (solvent to polymer ratio 8.0, w/w) was deactivated by adding 2-methyl-2,4-pentanediol in a molar ratio alcohol/Li active=0.5. Thereafter polymer solution was heated up to 90° C. and 0.25 mmol of hydrogenation catalyst ($Cp_2$ Ti(PhOCH$_3$)$_2$ or $Cp_2$ Ti ($CH_2$ PPh$_2$) as described in U.S. Pat. No. 5,985,995A) per 100 g of polymer were added, followed by hydrogen addition up to a pressure of 8 kg/cm$^2$ was reached. Hydrogen uptake was completed in 45 minutes. As revealed by $^1$H NMR analysis, it was obtained a star-type SEBS having 99.6% hydrogenation. Therefore, a novel star-type SEBS derived from a star-type SBS having 89.4 wt % vinyl content was thus obtained.

SEBS from examples 17 to 19 being derived from high vinyl content SBS are novel materials that must be more compatible with polypropylene than known SEBS.

Example 20 (Hypothetical)

Linear SBS block copolymer of example 10 synthesized using preferred polar modifier system of this invention, further subjected to end-functionalization and further subjected to hydrogenation to obtain a linear high vinyl end-functionalized SEBS-f.

Linear SBS from example 8 exhibiting 90.1 wt % total vinyl content and still dissolved in cyclohexane (solvent to polymer ratio 8.0, w/w) was end-functionalized with OH or secondary amine functional groups by adding quantitative amounts of either propylene oxide or n-benzylidenemethylamine (molar ratio functionalization agent/Li active=1.0). Thereafter, polymer solution was heated up to 90° C. and 0.25 mmol of hydrogenation catalyst ($Cp_2$ $Ti(PhOCH_3)_2$ or $Cp_2$ Ti ($CH_2$ $PPh_2$) as described in U.S. Pat. No. 5,985, 995A) per 100 g of polymer were added, followed by hydrogen addition up to a pressure of 8 kg/cm² was reached. Hydrogen uptake was completed in 45 minutes. As revealed by $^1$H NMR analysis, it was obtained an end-functionalized SEBS-f having 99.6% hydrogenation. Therefore, novel linear SEBS-OH or SEBS-NHR derived from a linear SBS having 90.1 wt % vinyl content were thus obtained.

End-functionalized SEBS from example 20 are new materials exhibiting OH or amine polar groups combined with high butylene enrichment along the central EB block. These novel materials are useful as reactive polymers to effect chain-extension reactions useful to produce novel segmented block copolymers and to be used more efficiently in engineering plastics impact modification and polymer blends compatibilization.

EMBODIMENTS OF THE INVENTION

Embodiment 1

A polar modifier system for making block copolymers of vinyl aromatic monomers and conjugated diene monomers by organolithium initiated anionic polymerization, comprising:
(a) a compound having the structure of formula (I):

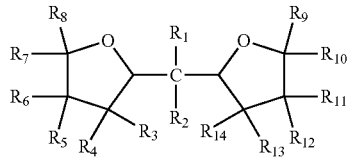
(I)

wherein $R_1$ thru $R_{14}$ independently are —H or —$C_nH_{2n+1}$ groups, wherein n=1 to 6, and
wherein ditetrahydrofurfurylpropane (DTHFP) is a preferred compound that has the structure of formula (I).

(b) a compound having the structure of formula (V):

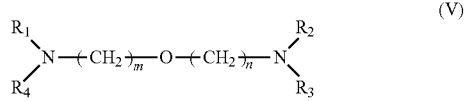
(V)

wherein m=1 to 2, n=1 to 2; and
wherein $R_1$ to $R_4$ independently are —$C_xH_{2x+1}$ groups, wherein x=1 to 6, and
wherein bis[2-(N,N-dimethylamino)ethyl] ether is a preferred compound that has the structure of formula (V); and
(c) a sodium alkoxide compound, preferably sodium mentholate
wherein the molar ratio of ditetrahydrofurfurylpropane to the organolithium initiator is within the range of about 0.36:1 to about 4.2:1, preferably about 1.5:1 to about 3.5:1 and more preferably about 2.5:1 to about 3.0;
wherein the molar ratio of bis[2-(N,N-dimethylamino) ethyl] ether to the organolithium initiator is within the range of about 0.1:1 to about 1.5:1, or about 0.2:1 to about 1:1, preferably about 0.3:1 to about 1:1, more preferably about 0.4:1 to about 0.9:1;
wherein the molar ratio of sodium alkoxide compound to the organolithium initiator is within the range of about 0.01:1 to about 0.3:1, or about 0.02:1 to about 0.2:1, or preferably about 0.03:1 to about 0.15:1, or more preferably about 0.04:1 to about 0.10:1.

Embodiment 2

A polar modifier system for making block copolymers of vinyl aromatic monomers and conjugated diene monomers by organolithium initiated anionic polymerization, comprising:
(a) a compound having the structure of formula (II):

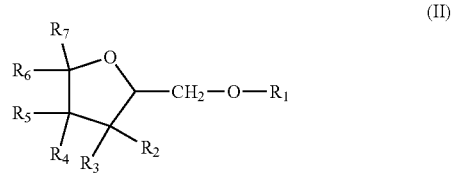
(II)

wherein R1 is a —$C_nH_{2n+1}$ group, wherein n=1 to 6; and
wherein R2 thru R7 independently are —H or —$C_xH_{2x+1}$ groups, wherein x=1 to 6.
(b) a compound having the structure of formula (V):

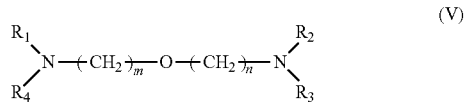
(V)

wherein m=1 to 2, n=1 to 2; and
wherein R1 to R4 independently are —$C_xH_{2x+1}$ groups, wherein x=1 to 6, and
wherein bis[2-(N,N-dimethylamino)ethyl] ether is a preferred compound that has the structure of formula (V); and
(c) a sodium alkoxide compound, preferably sodium mentholate,
wherein the molar ratio of ethyltetrahydrofurfuryl ether to the organolithium initiator is within the range of about 0.3:1 to about 4:1, preferably about 1:1 to about 3:1 and more preferably about 1.5:1 to about 2.5:1, wherein the molar ratio of bis[2-(N,N-dimethylamino) ethyl] ether to the organolithium initiator is within the range of about 0.1:1 to about 1.5:1, or about 0.2:1 to about 1:1, preferably about 0.3:1 to about 1:1, more preferably about 0.4:1 to about 0.9:1;

wherein the molar ratio of sodium alkoxide compound to the organolithium initiator is within the range of about 0.01:1 to about 0.3:1, or about 0.02:1 to about 0.2:1, or preferably about 0.03:1 to about 0.15:1, or more preferably about 0.04:1 to about 0.10:1.

Embodiment 3

A polar modifier system for making block copolymers of vinyl aromatic monomers and conjugated diene monomers by organolithium initiated anionic polymerization, comprising:

(a) a compound having the structure of formula (III):

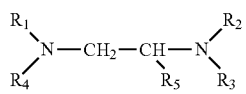

(III)

wherein $R_1$ to $R_4$ independently are —$CH_3$ or —$CH_2CH_3$ groups; and wherein $R_5$ is a —H or a —$C_nH_{2n+1}$ group, wherein n=1 to 2, and wherein N,N,N',N'-tetramethyl ethylenediamine is a preferred compound that has the structure of formula (III).

(b) a compound having the structure of formula (V):

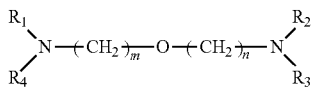

(V)

wherein m=1 to 2, n=1 to 2; and wherein $R_1$ to $R_4$ independently are —$C_nH_{2n+1}$ groups, wherein x=1 to 6, and wherein bis[2-(N,N-dimethylamino)ethyl] ether is a preferred compound that has the structure of formula (V); and (c) a sodium alkoxide compound, preferably sodium mentholate, wherein the molar ratio of N,N,N',N'-tetramethyl ethylenediamine to the organolithium initiator is within the range of about 1:1 to about 4:1, preferably about 1.5:1 to about 3:1 and more preferably about 2:1 to about 3:1, wherein the molar ratio of bis[2-(N,N-dimethylamino) ethyl] ether to the organolithium initiator is within the range of about 0.1:1 to about 1.5:1, or about 0.2:1 to about 1:1, preferably about 0.3:1 to about 1:1, more preferably about 0.4:1 to about 0.9:1;

wherein the molar ratio of sodium alkoxide compound to the organolithium initiator is within the range of about 0.01:1 to about 0.3:1, or about 0.02:1 to about 0.2:1, or preferably about 0.03:1 to about 0.15:1, or more preferably about 0.04:1 to about 0.10:1.

Embodiment 4

A polar modifier system for making block copolymers of vinyl aromatic monomers and conjugated diene monomers by organolithium initiated anionic polymerization, comprising:

(a) a compound having the structure of formula (IV):

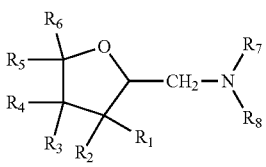

(IV)

wherein $R_1$ to R6 independently are —H or —$C$—$H_{2n+1}$ groups, wherein n=1 to 6;

wherein R7 and R8 independently are —$C_nH_{2n+1}$ groups, wherein x=1 to 2, and wherein tetrahydrofurfuryl-N,N-dimethylamine is a preferred compound that has the structure of formula (IV).

(b) a compound having the structure of formula (V):

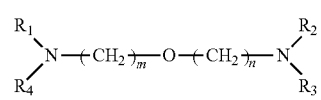

(V)

wherein m=1 to 2, n=1 to 2; and wherein R1 to R4 independently are —$C_nH_{2n+1}$ groups, wherein x=1 to 6, and wherein bis[2-(N,N-dimethylamino)ethyl] ether is a preferred compound that has the structure of formula (V); and (c) a sodium alkoxide compound, preferably sodium mentholate, wherein the molar ratio of tetrahydrofurfuryl-N,N-dimethylamine to the organolithium initiator is within the range of about 1:1 to about 4:1, preferably about 1.5:1 to about 3:1 and more preferably about 2:1 to about 3:1, wherein the molar ratio of bis[2-(N,N-dimethylamino) ethyl] ether to the organolithium initiator is within the range of about 0.1:1 to about 1.5:1, or about 0.2:1 to about 1:1, preferably about 0.3:1 to about 1:1, more preferably about 0.4:1 to about 0.9:1;

wherein the molar ratio of sodium alkoxide compound to the organolithium initiator is within the range of about 0.01:1 to about 0.3:1, or about 0.02:1 to about 0.2:1, or preferably about 0.03:1 to about 0.15:1, or more preferably about 0.04:1 to about 0.10:1.

Having described the invention above, various modifications of the techniques, procedures, materials, and equipment will be apparent to those skilled in the art. It is intended that all such variations within the scope and spirit of the invention be included within the scope of the appended claims.

What is claimed is:

1. A polar modifier system for making block copolymers of vinyl aromatic monomers and conjugated diene monomers by anionic polymerization using an organolithium initiator, comprising:
   (a) one or more of the chemicals selected from the group consisting of ditetrahydrofurfurylpropane, ethyltetrahydrofurfuryl ether, N,N,N',N'-tetramethyl ethylenediamine and tetrahydrofurfuryl-N,N-dimethylamine;
   (b) bis[2-(N,N-dimethylamino)ethyl] ether (BDMAEE); and
   (c) a sodium alkoxide compound.

2. The polar modifier system of claim 1, wherein the molar ratio of the sodium alkoxide compound to the organolithium initiator is between about 0.01:1 and about 0.3:1.

3. The polar modifier system of claim 1, wherein the molar ratio of the sodium alkoxide compound to the organolithium initiator is between about 0.01:1 and about 0.3:1, wherein the molar ratio of bis[2-(N,N-dimethylamino)ethyl] ether to the organolithium initiator is between 0.1:1 and 1.5:1, wherein ditetrahydrofurfurylpropane is selected from the group, and wherein the molar ratio of ditetrahydrofurfurylpropane to the organolithium initiator is between about 0.36:1 and about 4.2:1.

4. The polar modifier system of claim 1, wherein the molar ratio of the sodium alkoxide compound to the organolithium initiator is between about 0.01:1 and about 0.3:1, wherein the molar ratio of BDMAEE to the organolithium initiator is between 0.1:1 and 1.5:1, wherein ethyltetrahydrofurfuryl ether is selected from the group, and wherein the molar ratio of ethyltetrahydrofurfuryl ether to the organolithium initiator is between about 0.3:1 and about 4:1.

5. The polar modifier system of claim 1, wherein the molar ratio of the sodium alkoxide compound to the organolithium initiator is between about 0.01:1 and about 0.3:1, wherein the molar ratio of BDMAEE to the organolithium initiator is between 0.1:1 and 1.5:1, wherein N,N,N',N'-tetramethyl ethylenediamine is selected from the group, and wherein the molar ratio of N,N,N',N'-tetramethyl ethylenediamine to the organolithium initiator is between about 1:1 and about 4:1.

6. The polar modifier system of claim 1, wherein the molar ratio of the sodium alkoxide compound to the organolithium initiator is between about 0.01:1 and about 0.3:1, wherein the molar ratio of BDMAEE to the organolithium initiator is between 0.1:1 and 1.5:1, wherein tetrahydrofurfuryl-N,N-dimethylamine is selected from the group, and wherein the molar ratio of tetrahydrofurfuryl-N,N-dimethylamine to the organolithium initiator is between about 1:1 and about 4:1.

7. A process for making block copolymers of vinyl aromatic monomers and conjugated diene monomers, comprising the steps of:
charging an aliphatic hydrocarbon solvent to a reactor;
charging the polar modifier system of any one of claims 1-6 to the reactor;
adding as a first monomer charge to the reactor one of the monomers selected from the group of monomers consisting of a vinyl aromatic monomer and a conjugated diene monomer;
charging an organolithium initiator to the reactor;
polymerizing the first monomer charge to at least about 85% conversion;
adding as a second monomer charge to the reactor the other monomer selected from the group of monomers consisting of the vinyl aromatic monomer and the conjugated diene monomer;
polymerizing the second monomer charge,
wherein one or both of the steps of adding the first and second monomer charges is or is not repeated; and
recovering a block copolymer of vinyl aromatic monomer and conjugated diene monomer, wherein the block copolymer has a vinyl content of greater than 85 wt % on a conjugated diene repeat unit basis that includes 1,2-vinyl and VCP repeat units and a VCP content of less than 6 wt % on a total conjugated diene basis.

8. The process of claim 7, wherein one or both of the steps of adding the first and second monomer charges is repeated.

9. The process of claim 7, further comprising allowing for full consumption of the last monomer charge; and charging a termination agent to the reactor.

10. The process of claim 7, further comprising allowing for the consumption of the last monomer charge to at least 95% conversion; charging a coupling agent to the reactor; and charging a termination agent to the reactor.

11. The process of claim 10, wherein the coupling agent is a silicon halide.

12. The process of claim 10, wherein the coupling agent is an epoxy-functionalized acrylate oligomer or an epoxidized soybean oil.

13. The process of claim 10, wherein the coupling agent is divinylbenzene.

14. The process of claim 7, wherein the block copolymer has a molecular weight distribution that has a unimodal peak, and wherein the block copolymer has a polydispersity index Mw/Mn that is lower than about 1.08.

15. The process of claim 7, wherein the block copolymer has a total vinyl aromatic repeat unit content that ranges between about 10 and about 40 wt % on a copolymer basis, and wherein a randomized vinyl aromatic repeat unit content is lower than 15 wt % on a vinyl aromatic repeat unit basis.

16. The process of claim 7, further comprising allowing for the consumption of the last monomer charge to at least 95% conversion; charging a coupling agent to the reactor; and charging a termination agent to the reactor, wherein a coupled block copolymer is produced with a coupling efficiency higher than 75 wt %.

17. The process of claim 7, wherein the block copolymer has a peak molecular weight, Mp, of about 50 kg/mol to about 280 kg/mol as measured by Gel Permeation Chromatography calibrated with a polystyrene standard.

18. The process of claim 7, further comprising allowing for the consumption of the last monomer charge to at least 95% conversion; charging a coupling agent to the reactor; and charging a termination agent to the reactor, wherein an un-coupled copolymer fraction is produced that has a peak molecular weight of about 20 kg/mol to about 120 kg/mol as measured by Gel Permeation Chromatography calibrated with polystyrene standards.

19. The process of claim 7, further comprising charging an electrophilic terminal functionalization additive to the reactor to make a chain-end functionalized polymer.

20. The process of claim 7, wherein the mass ratio of solvent to total monomer is from 7.5 to 11.

21. The process of claim 7, wherein the block copolymer has a total vinyl content greater than about 87 wt % on a total conjugated diene basis including 1,2-vinyl plus 3,4-vinyl plus VCP content.

22. The process of claim 21, wherein the VCP content is less than about 5 wt % on a total conjugated diene basis.

23. The process of claim 7, wherein the sodium alkoxide compound is sodium mentholate.

24. The process of claim 7, wherein the organolithium initiator is n-butyllithium or sec-butyllithium.

25. The process of claim 7, wherein each of the vinyl aromatic monomer and the conjugated diene monomer is dosed to the reactor in a period shorter than 5 minutes.

26. The process of claim 7, wherein at least one of the vinyl aromatic monomer and the conjugated diene monomer is dosed to the reactor in a period longer than 5 minutes.

27. The process of claim 7, further comprising hydrogenating the block copolymer.

28. The process of claim 27, wherein at least 90% of double bonds in conjugated diene in the block copolymer are converted to single bonds by hydrogenating the block copolymer.

29. A polar modifier system for making block copolymers of vinyl aromatic monomers and conjugated diene monomers by anionic polymerization using an organolithium initiator, wherein the block copolymers have a unimodal molecular weight distribution prior to a coupling reaction, a vinyl content of greater than 85 wt % on a conjugated diene repeat unit basis that includes 1,2-vinyl and vinylcyclopentane (VCP) repeat units and a VCP content of less than 6 wt % on a total conjugated diene basis, the polar modifier system comprising:
  (a) one or more of the chemicals selected from the group consisting of
    ditetrahydrofurfurylpropane (DTHFP) at a molar ratio of DTHFP to the organolithium initiator of between 0.36:1 and 4.2:1,
    ethyltetrahydrofurfuryl ether (ETE) at a molar ratio of ETE to the organolithium initiator of between 0.3:1 and 4:1,
    N,N,N',N'-tetramethyl ethylenediamine (TMEDA) at a molar ratio of TMEDA to the organolithium initiator of between 1:1 and 4:1 and
    tetrahydrofurfuryl-N,N-dimethylamine at a molar ratio of tetrahydrofurfuryl-N,N-dimethylamine to the organolithium initiator of between 1:1 and 4:1;
  (b) bis[2-(N,N-dimethylamino)ethyl] ether (BDMAEE), wherein the molar ratio of BDMAEE to the organolithium initiator is between 0.1:1 and 1.5:1; and
  (c) a sodium alkoxide compound, wherein the molar ratio of the sodium alkoxide compound to the organolithium initiator is between 0.01:1 and 0.3:1.

30. A polar modifier system for making block copolymers of vinyl aromatic monomers and conjugated diene monomers by organolithium initiated anionic polymerization, wherein the block copolymers have a unimodal molecular weight distribution prior to a coupling reaction, a vinyl content of greater than 85 wt % on a conjugated diene repeat unit basis that includes 1,2-vinyl and vinylcyclopentane (VCP) repeat units and a VCP content of less than 6 wt % on a total conjugated diene basis, the polar modifier system comprising:
  (a) a compound having the structure of formula (I):

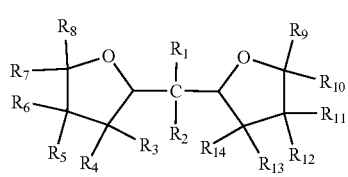

(I)

wherein $R_1$ thru $R_{14}$ independently are —H or —$C_nH_{2n+1}$ groups, wherein n=1 to 6, and
  (b) a compound having the structure of formula (V):

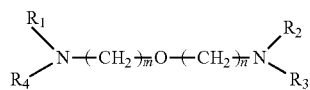

(V)

wherein m=1 to 2, n=1 to 2; and
  wherein $R_1$ to $R_4$ independently are —$C_xH_{2x+1}$ groups, wherein x=1 to 6, and
  (c) a sodium alkoxide compound
  wherein the amount of the compound having the structure of formula (I) is from 0.36 to 4.2 moles per mol of organolithium initiator;
  wherein the amount of the compound having the structure of formula (V) is from 0.1 to 1.5 moles per mol of the organolithium initiator;
  wherein the amount of the sodium alkoxide compound is from 0.01 to 0.3 moles per mol of to the organolithium initiator.

31. A polar modifier system for making block copolymers of vinyl aromatic monomers and conjugated diene monomers by organolithium initiated anionic polymerization, comprising:
  (a) a compound having the structure of formula (II):

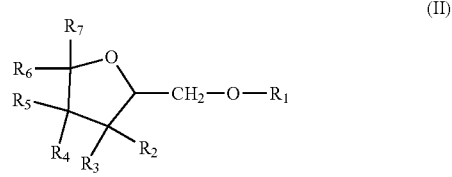

(II)

wherein $R_1$ is a —$C_nH_{2n+1}$ group, wherein n=1 to 6; and
  wherein $R_2$ thru $R_7$ independently are —H or —$C_xH_{2x+1}$ groups, wherein x=1 to 6, and
  (b) a compound having the structure of formula (V):

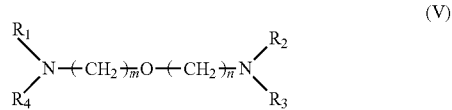

(V)

wherein m=1 to 2, n=1 to 2; and
  wherein $R_1$ to $R_4$ independently are —$C_xH_{2x+1}$ groups, wherein x=1 to 6, and
  (c) a sodium alkoxide compound,
  wherein the amount of the compound having the structure of formula (TI) is from 0.3 to 4 moles per mol of the organolithium initiator;
  wherein the amount of the compound having the structure of formula (V) is from 0.1 to 1.5 moles per mol of the organolithium initiator;
  wherein the amount of sodium alkoxide compound is from 0.01 to 0.3 moles per mol of the organolithium initiator.

32. A polar modifier system for making block copolymers of vinyl aromatic monomers and conjugated diene monomers by organolithium initiated anionic polymerization, comprising:
  (a) a compound having the structure of formula (III):

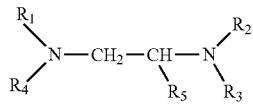

(III)

wherein $R_1$ to $R_4$ independently are —$CH_3$ or —$CH_2CH_3$ groups; and wherein $R_5$ is a —H or a —$C_nH_{2n+1}$ group, wherein n=1 to 2, and (b) a compound having the structure of formula (V):

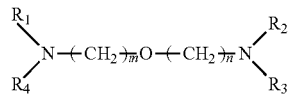

(V)

wherein m=1 to 2, n=1 to 2; and wherein $R_1$ to $R_4$ independently are —$C_xH_{2x+1}$ groups, wherein x=1 to 6, and (c) a sodium alkoxide compound, wherein the amount of the compound having the structure of formula (III) is from 1 to 4 moles per mol of the organolithium initiator;

wherein the amount of the compound having the structure of formula (V) is from 0.1 to 1.5 moles per mol of the organolithium initiator;

wherein the amount of sodium alkoxide compound is from 0.01 to 0.3 moles per mol of the organolithium initiator.

33. A polar modifier system for making block copolymers of vinyl aromatic monomers and conjugated diene monomers by organolithium initiated anionic polymerization, comprising:

(a) a compound having the structure of formula (IV):

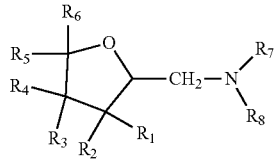

(IV)

wherein $R_1$ to $R_6$ independently are —H or —$C_nH_{2n+1}$ groups, wherein n=1 to 6;

wherein $R_7$ and $R_8$ independently are —$C_xH_{2x+1}$ groups, wherein x=1 to 2, and (b) a compound having the structure of formula (V):

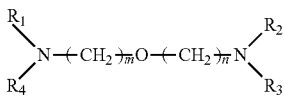

(V)

wherein m=1 to 2, n=1 to 2; and wherein $R_1$ to $R_4$ independently are —$C_xH_{2x+1}$ groups, wherein x=1 to 6, and (c) a sodium alkoxide compound, wherein the amount of the compound having the structure of formula (IV) is from 1 to 4 moles per mol of the organolithium initiator;

wherein the amount of the compound having the structure of formula (V) is from 0.1 to 1.5 moles per mol of the organolithium initiator;

wherein the amount of sodium alkoxide compound is from 0.01 to 0.3 moles per mol of the organolithium initiator.

* * * * *